US009913205B2

(12) United States Patent
Xia

(10) Patent No.: US 9,913,205 B2
(45) Date of Patent: Mar. 6, 2018

(54) INFORMATION TRANSMISSION METHOD, BASE STATION, AND USER EQUIPMENT

(71) Applicant: Huawei Technologies Co., Ltd., Shenzhen (CN)

(72) Inventor: Jinhuan Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 275 days.

(21) Appl. No.: 14/802,917

(22) Filed: Jul. 17, 2015

(65) Prior Publication Data

US 2015/0327154 A1   Nov. 12, 2015

Related U.S. Application Data

(63) Continuation of application No. PCT/CN2014/070904, filed on Jan. 20, 2014.

(30) Foreign Application Priority Data

Jan. 18, 2013  (CN) .......................... 2013 1 0020016

(51) Int. Cl.
*H04W 48/10* (2009.01)
*H04W 68/02* (2009.01)
(Continued)

(52) U.S. Cl.
CPC .............. *H04W 48/10* (2013.01); *H04L 1/08* (2013.01); *H04W 4/06* (2013.01); *H04W 48/12* (2013.01);
(Continued)

(58) Field of Classification Search
CPC ... H04W 48/10; H04W 72/005; H04W 68/02; H04W 72/048; H04W 68/00;
(Continued)

(56) References Cited

U.S. PATENT DOCUMENTS 6,343,212 B1   1/2002  Weber et al.
2007/0281715 A1  12/2007  Take
(Continued)

FOREIGN PATENT DOCUMENTS

CN    1268857 A    10/2000
CN    1893314 A    1/2007
(Continued)

OTHER PUBLICATIONS

"Coverage Enhancement of Physical Broadcast Channel and SIB Transmission," 3GPP TSG RAN WG1 Meeting #74bis, Guangzhou, China, R1-134302, 3rd Generation Partnership Project, Valbonne, France (Oct. 7-11, 2013).
(Continued)

*Primary Examiner* — Pao Sinkantarakorn
*Assistant Examiner* — Kabir Jahangir
(74) *Attorney, Agent, or Firm* — Leydig, Voit & Mayer, Ltd.

(57) ABSTRACT

The present invention provides a method for transmitting common information, a base station, and user equipment, where the method includes: generating additional information according to the common information, where the common information is a paging message and/or system information, and data packets of the additional information and data packets of the common information are the same at a Media Access Control MAC layer; and sending the common information and the additional information to the user equipment. In embodiments of the present invention, because the additional information and the common information carry same MAC layer data packet content, in a case of receiving the common information and the additional information, the user equipment may determine a data packet at the MAC layer according to the common information and the addi-
(Continued)

tional information; therefore a probability of correct detection of the common information may be increased.

16 Claims, 7 Drawing Sheets

(51) Int. Cl.
*H04W 72/04* (2009.01)
*H04W 72/00* (2009.01)
*H04W 4/06* (2009.01)
*H04W 48/12* (2009.01)
*H04W 68/00* (2009.01)
*H04L 1/08* (2006.01)
*H04W 80/02* (2009.01)

(52) U.S. Cl.
CPC ........... *H04W 68/00* (2013.01); *H04W 68/02* (2013.01); *H04W 72/005* (2013.01); *H04W 72/048* (2013.01); *H04W 80/02* (2013.01)

(58) Field of Classification Search
CPC ....... H04W 48/12; H04W 4/06; H04W 80/02; H04W 28/048; H04W 28/06; H04L 1/08; H04L 1/189
See application file for complete search history.

(56) References Cited

U.S. PATENT DOCUMENTS

| | | |
|---|---|---|
| 2009/0017797 A1 | 1/2009 | Li et al. |
| 2010/0118847 A1 | 5/2010 | Lee et al. |
| 2010/0325504 A1* | 12/2010 | Lee ...................... H04L 1/1812 714/748 |

FOREIGN PATENT DOCUMENTS

| | | |
|---|---|---|
| CN | 101578907 A | 11/2009 |
| CN | 101690353 A | 3/2010 |
| CN | 101729139 A | 6/2010 |
| CN | 101902777 A | 12/2010 |
| EP | 1507432 A2 | 2/2005 |
| WO | 2005006800 A1 | 1/2005 |
| WO | WO 2009063422 A1 | 5/2009 |

OTHER PUBLICATIONS

"System Information Support for Deep Hole Low Cost MTC UEs," 3GPP TSG-RAN WG1 Meeting #75, San Francisco, California, R1-135134, 3$^{rd}$ Generation Partnership Project, Valbonne, France (Nov. 11-15, 2013).

"SIB Coverage Improvement," 3GPP TSG RAN WG1 Meeting #75, San Francisco, California, R1-135358, 3$^{rd}$ Generation Partnership Project, Valbonne, France (Nov. 11-15, 2013).

Holma et al., "LTE for UMTS: Evolution to LTE-Advanced; LTE Radio Protocols," LTE for UMTS: Evolution to LTE-Advanced, pp. 152-153, Wiley, Chichester, United Kingdom (Mar. 2, 2011).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.4.0, pp. 1-208, 3rd Generation Partnership Project, Valbonne, France, (Dec. 2012).

"3rd Generation Partnership Project; Technical Specification Group Radio Radio Access Network; Evolved Universal Terrestrial Radio Access (E-UTRA); Radio Resource Control (RRC); Protocol specification (Release 11)," 3GPP TS 36.331 V11.2.0, pp. 1-340, 3rd Generation Partnership Project, Valbonne, France, (Dec. 2012).

"3$^{rd}$ Generation Partnership Project; Technical Specification Group Radio Access Network; Evolved Universal Terrestrial Radio Access (E-UTRA); User Equipment (UE) procedures in idle mode(Release 11)," 3GPP TS 36.304, V11.2.0, 3$^{rd}$ Generation Partnership Project, Valbonne, France (Dec. 2012).

* cited by examiner

INFORMATION TRANSMISSION METHOD, BASE STATION, AND USER EQUIPMENT

CROSS-REFERENCE TO RELATED APPLICATIONS

This application is a continuation of International Patent Application No. PCT/CN2014/070904, filed on Jan. 20, 2014, which claims priority to Chinese Patent Application No. 201310020016.4, filed on Jan. 18, 2013, both of which are hereby incorporated by reference in their entireties.

TECHNICAL FIELD

Embodiments of the present invention relate to the field of wireless communications technologies, and more specifically, to an information transmission method, a base station, and user equipment.

BACKGROUND

As communications systems continuously develop and improve, people's requirement for communication quality becomes increasingly high. Although some existing user equipments are in a coverage range of a cell, a probability of correct detection, by these user equipments, of a paging message or a system message sent by a base station is relatively low, because such cases as high penetration loss of a wireless signal and low receiver sensitivity of user equipment may practically occur.

For example, user equipment 1 and user equipment 2 are at a same distance from an outdoor base station and are both in a coverage range of the base station, but user equipment 1 is located in an outdoor open field while user equipment 2 is located in a specific location (for example, a basement or within a building). In this case, there is a loss when user equipment 2 receives a signal sent by the base station. In other words, a coverage range of a base station for user equipment located in a specific location is less than that for other user equipment.

SUMMARY

The present invention provides a method for transmitting common information, a base station, and user equipment, which can improve performance of user equipment in detecting common information.

According to a first aspect, the present invention provides a method for transmitting common information, including:
generating additional information according to common information, where the common information is a paging message and/or system information, and data packets of the additional information and data packets of the common information are the same at a Media Access Control MAC layer; and
sending the common information and the additional information to user equipment.

With reference to the first aspect, in a first possible implementation manner, the generating additional information according to common information includes:
generating, in a physical layer channel modulation and coding scheme, the additional information by using original information bits the same as those of the common information and coding redundant bits whose version is different from that of coding redundant bits of the common information; or
generating the additional information in a resource mapping manner that ensures a same effective bit rate as that of the common information; or
generating the additional information in a channel coding and signal modulation scheme the same as that of the common information; or
generating the additional information in a resource mapping manner that ensures a same effective bit rate as that of the common information and in a channel coding and signal modulation scheme the same as that of the common information; or
generating the additional information in a resource mapping manner that ensures a same effective bit rate as that of the common information and by mapping to a frequency domain resource location the same as that of the common information.

With reference to the first aspect or the first possible implementation manner, in a second possible implementation manner, before the sending the common information and the additional information to user equipment, the method further includes:
determining, according to specific information, a quantity of times that the additional information is to be sent to the user equipment, where
the specific information includes one or more of the following: a wireless communication protocol, a parameter carried in a physical broadcast channel, and requirement information of the user equipment.

With reference to the second possible implementation manner, in a third possible implementation manner, the determining, according to specific information, a quantity of times that the additional information is to be sent to the user equipment includes:
in a case in which the specific information is the wireless communication protocol, determining, according to a quantity of times, stipulated in the wireless communication protocol, that the common information and the additional information are to be sent, the quantity of times that the additional information is to be sent to the user equipment;
in a case in which the specific information is the parameter carried in a physical broadcast channel, where the parameter carried in a physical broadcast channel includes information about a quantity of times that the common information and the additional information are to be sent, determining, according to the information about a quantity of times, the quantity of times that the additional information is to be sent to the user equipment; and
in a case in which the specific information includes the wireless communication protocol and the parameter carried in the physical broadcast channel, determining, according to a rule stipulated in the wireless communication protocol and the parameter carried in a physical broadcast channel, the quantity of times that the additional information is to be sent to the user equipment.

With reference to the second possible implementation manner or the third possible implementation manner, in a fourth possible implementation manner, the method further includes:
determining, according to the wireless communication protocol or the parameter carried in a physical broadcast channel, a radio resource set that can be used to send the common information and the additional information, where the radio resource set includes a radio frame; and
determining, from the radio resource set, a radio resource to be used to send the common information and the additional information to the user equipment.

With reference to the fourth possible implementation manner, in a fifth possible implementation manner, the determining, from the radio resource set, a radio resource to be used to send the common information and the additional information to the user equipment includes:

in a case in which the common information is a paging message, determining, from the radio resource set according to the requirement information of the user equipment and an identifier ID of the user equipment, the radio resource to be used to send the common information and the additional information to the user equipment; and in a case in which the common information is system information, determining, from the radio resource set according to the wireless communication protocol and/or the parameter carried in a physical broadcast channel, the radio resource to be used to send the common information and the additional information to the user equipment.

With reference to the fifth possible implementation manner, in a sixth possible implementation manner, the determining, from the radio resource set according to the requirement information of the user equipment and an identifier ID of the user equipment, the radio resource to be used to send the common information and the additional information to the user equipment includes:

determining, according to the requirement information of the user equipment, to use one or more radio frames to send the common information and the additional information;

determining a system frame number of the one or more radio frames from the radio resource set according to the ID of the user equipment; and determining, according to the requirement information of the user equipment and the ID of the user equipment, a subframe number of the common information and the additional information in the one or more radio frames.

According to a second aspect, the present invention provides a method for transmitting common information, including:

receiving common information and additional information sent by a base station, where the common information is a paging message and/or system information, and data packets of the additional information and data packets of the common information are the same at a Media Access Control MAC layer; and determining a data packet at the MAC layer according to the common information and the additional information.

With reference to the second aspect, in a first possible implementation manner, the determining a data packet at the MAC layer according to the common information and the additional information includes:

in a case in which the common information and the additional information are generated by using same original information bits and coding redundant bits of different versions in a physical layer modulation and coding scheme, determining the data packet at the MAC layer with reference to the coding redundant bits of different versions and the original information bits;

in a case in which the common information and the additional information are generated in a resource mapping manner that ensures a same effective bit rate, determining soft bit information from the common information and the additional information and accumulating the soft bit information, so as to determine the data packet at the MAC layer;

in a case in which the common information and the additional information are generated in a same channel coding and signal modulation scheme, and in a case in which the common information and the additional information are generated in a resource mapping manner that ensures a same effective bit rate and in a same channel coding and signal modulation scheme, determining originally sent signals from the common information and the additional information and accumulating the originally sent signals, so as to determine the data packet at the MAC layer; or determining soft bit information from the common information and the additional information and accumulating the soft bit information, so as to determine the data packet at the MAC layer; and in a case in which the common information and the additional information are generated in a resource mapping manner that ensures a same effective bit rate and by mapping to a same frequency domain resource location, determining originally sent signals from the common information and the additional information and accumulating the determined originally sent signals, so as to determine the data packet at the MAC layer; or determining soft bit information from the common information and the additional information and accumulating the soft bit information, so as to determine the data packet at the MAC layer; or combining received signals that are received in a same frequency domain resource location and are of the common information and the additional information, so as to determine the data packet at the MAC layer.

With reference to the second aspect or the first possible implementation manner, in a second possible implementation manner, before the receiving common information and additional information sent by a base station, the method further includes:

determining a radio resource that is used to receive the common information and a radio resource that is used to receive the additional information.

With reference to the second possible implementation manner, in a third possible implementation manner, the determining a radio resource that is used to receive the common information and a radio resource that is used to receive the additional information includes:

determining a radio resource set according to a wireless communication protocol or a parameter carried in a physical broadcast channel; and determining, from the radio resource set, the radio resource that is used to receive the common information and the radio resource that is used to receive the additional information.

With reference to the third possible implementation manner, in a fourth possible implementation manner, the determining, from the radio resource set, the radio resource that is used to receive the common information and the radio resource that is used to receive the additional information includes:

in a case in which the common information is a paging message, determining, from the radio resource set according to requirement information and an identifier ID of the user equipment, the radio resource that is used to receive the common information and the radio resource that is used to receive the additional information; and in a case in which the common information is system information, determining, from the radio resource set according to the wireless communication protocol and/or the parameter carried in a physical broadcast channel, the radio resource that is used to receive the common information and the radio resource that is used to receive the additional information.

With reference to the fourth possible implementation manner, in a fifth possible implementation manner, the determining, from the radio resource set according to requirement information and an identifier ID of the user equipment, the radio resource that is used to receive the common information and the radio resource that is used to receive the additional information includes:

determining, according to the requirement information, to receive the common information and the additional information in one or more radio frames;

determining a system frame number of the one or more radio frames from the radio resource set according to the ID of the user equipment; and determining, according to the requirement information and the ID of the user equipment, a subframe number of the common information and the additional information in the one or more radio frames, where the one or more radio frames belong to the radio resource subset.

According to a third aspect, the present invention provides a base station, including:

a control unit, configured to generate additional information according to common information, where the common information is a paging message and/or system information, and data packets of the additional information and data packets of the common information are the same at a Media Access Control MAC layer; and a radio frequency unit, configured to send the common information and the additional information to user equipment.

With reference to the third aspect, in a first possible implementation manner, the control unit is specifically configured to generate, in a physical layer channel modulation and coding scheme, the additional information by using original information bits the same as those of the common information and coding redundant bits whose version is different from that of coding redundant bits of the common information; or the control unit is specifically configured to generate the additional information in a resource mapping manner that ensures a same effective bit rate as that of the common information; or the control unit is specifically configured to generate the additional information in a channel coding and signal modulation scheme the same as that of the common information; or the control unit is specifically configured to generate the additional information in a resource mapping manner that ensures a same effective bit rate as that of the common information and in a channel coding and signal modulation scheme the same as that of the common information; or the control unit is specifically configured to generate the additional information in a resource mapping manner that ensures a same effective bit rate as that of the common information and by mapping to a frequency domain resource location the same as that of the common information.

With reference to the third aspect or the first possible implementation manner, in a second possible implementation manner, the control unit is specifically configured to determine, according to specific information, a quantity of times that the additional information is to be sent by the radio frequency unit to the user equipment, where the specific information includes one or more of the following: a wireless communication protocol, a parameter carried in a physical broadcast channel, and requirement information of the user equipment.

With reference to the second possible implementation manner, in a third possible implementation manner, the control unit is specifically configured to, in a case in which the specific information is the wireless communication protocol, determining, according to a quantity of times, stipulated in the wireless communication protocol, that the common information and the additional information are to be sent, the quantity of times that the additional information is to be sent by the radio frequency unit to the user equipment;

the control unit is specifically configured to, in a case in which the specific information is the parameter carried in a physical broadcast channel, where the parameter carried in a physical broadcast channel includes information about a quantity of times that the common information and the additional information are to be sent, determine, according to the information about a quantity of times, the quantity of times that the additional information is to be sent by the radio frequency unit to the user equipment; and the control unit is specifically configured to, in a case in which the specific information includes the wireless communication protocol and the parameter carried in a physical broadcast channel, determine, according to a rule stipulated in the wireless communication protocol and the parameter carried in a physical broadcast channel, the quantity of times that the additional information is to be sent to the user equipment.

With reference to the second possible implementation manner or the third possible implementation manner, in a fourth possible implementation manner, the control unit is further configured to determine, according to the wireless communication protocol or the parameter carried in a physical broadcast channel, a radio resource set that can be used to send the common information and the additional information, where the radio resource set includes a radio frame; and the control unit is further configured to determine, from the radio resource set, a radio resource to be used to send the common information and the additional information to the user equipment, where the radio resource belongs to the radio resource set.

With reference to the fourth possible implementation manner, in a fifth possible implementation manner, the control unit is specifically configured to determine, from the radio resource set according to the requirement information of the user equipment and an identifier ID of the user equipment, the radio resource to be used to send the common information and the additional information to the user equipment, where the radio resource belongs to the radio resource set and the common information is a paging message; and the control unit is specifically configured to determine, from the radio resource set according to the wireless communication protocol and/or the parameter carried in a physical broadcast channel, the radio resource to be used to send the common information and the additional information to the user equipment, where the radio resource belongs to the radio resource set and the common information is system information.

With reference to the fifth possible implementation manner, in a sixth possible implementation manner, the control unit is specifically configured to determine, according to the requirement information of the user equipment, to use one or more radio frames to send the common information and the additional information;

the control unit is specifically configured to determine a system frame number of the one or more radio frames from the radio resource set according to the ID of the user equipment; and the control unit is specifically configured to determine, according to the requirement information of the user equipment and the ID of the user equipment, a subframe number of the common information and the additional information in the one or more radio frames.

According to a fourth aspect, the present invention provides user equipment, including:

a radio frequency unit, configured to receive common information and additional information sent by a base station, where the common information is a paging message and/or system information, and data packets of the additional information and data packets of the common information are the same at a Media Access Control MAC layer; and a determining unit, configured to determine a data packet at the MAC layer according to the common information and the additional information.

With reference to the fourth aspect, in a first possible implementation manner, the determining unit is specifically configured to, in a case in which the common information and the additional information are generated by using same original information bits and coding redundant bits of different versions in a physical layer modulation and coding scheme, determine the data packet at the MAC layer with reference to the coding redundant bits of different versions and the original information bits;

the determining unit is specifically configured to, in a case in which the common information and the additional information are generated in a resource mapping manner that ensures a same effective bit rate, determine soft bit information from the common information and the additional information and accumulate the soft bit information, so as to determine the data packet at the MAC layer;

the determining unit is specifically configured to, in a case in which the common information and the additional information are generated in a resource mapping manner that ensures a same effective bit rate, and in a case in which the common information and the additional information are generated in a resource mapping manner that ensures a same effective bit rate and in a same channel coding and signal modulation scheme, determine originally sent signals from the common information and the additional information and accumulate the determined originally sent signals, so as to determine the data packet at the MAC layer; or determine soft bit information from the common information and the additional information and accumulate the soft bit information, so as to determine the data packet at the MAC layer; and the determining unit is specifically configured to, in a case in which the common information and the additional information are generated in a resource mapping manner that ensures a same effective bit rate and by mapping to a same frequency domain resource location, determine originally sent signals from the common information and the additional information and accumulate the determined originally sent signal, so as to determine the data packet at the MAC layer; or determine soft bit information from the common information and the additional information and accumulate the soft bit information, so as to determine the data packet at the MAC layer; or combine received signals that are received in a same frequency domain resource location and are of the common information and the additional information, so as to determine the data packet at the MAC layer.

With reference to the fourth aspect or the first possible implementation manner, in a second possible implementation manner, the control unit is further configured to determine a radio resource that is used to receive the common information and a radio resource that is used to receive the additional information.

With reference to the second possible implementation manner, in a third possible implementation manner, the control unit is specifically configured to determine a radio resource set according to a wireless communication protocol or a parameter carried in a physical broadcast channel; and the control unit is specifically configured to determine, from the radio resource set, the radio resource that is used to receive the common information and the radio resource that is used to receive the additional information.

With reference to the third possible implementation manner, in a fourth possible implementation manner, the control unit is specifically configured to, in a case in which the common information is a paging message, determine, from the radio resource set according to requirement information of the user equipment and an identifier ID of the user equipment, the radio resource that is used to receive the common information and the radio resource that is used to receive the additional information; and the control unit is specifically configured to, in a case in which the common information is system information, determine, from the radio resource set according to the wireless communication protocol and/or the parameter carried in a physical broadcast channel, the radio resource that is used to receive the common information and the radio resource that is used to receive the additional information.

With reference to the fourth possible implementation manner, in a fifth possible implementation manner, the control unit is specifically configured to determine, according to the requirement information, to receive the common information and the additional information in one or more radio frames;

the control unit is specifically configured to determine a system frame number of the one or more radio frames from the radio resource set according to the ID of the user equipment; and the control unit is specifically configured to determine, according to the requirement information and the ID of the user equipment, a subframe number of the common information and the additional information in the one or more radio frames.

According to embodiments of the present invention, when sending common information to user equipment, a base station further sends additional information to the user equipment, where data packets of the additional information and data packets of the common information are the same at a MAC layer. Thus, in a case of receiving the common information and the additional information, the user equipment may determine a data packet at the MAC layer according to the common information and the additional information; therefore a probability of correct detection of the common information may be increased.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System of Mobile communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a General Packet Radio Service (General Packet Radio Service, "GPRS" for short) system, a Long Term Evolution (Long Term Evolution, "LTE" for short) system, an LTE Frequency Division Duplex (Frequency Division Duplex, "FDD" for short) system, an LTE Time Division Duplex (Time Division Duplex, "TDD" for short) system, and a Universal Mobile Telecommunications System (Universal Mobile Telecommunication System, "UMTS" for short).

A UE may also be referred to as a mobile terminal (Mobile Terminal, MT), mobile user equipment, and the like, and may communicate with one or more core networks through a radio access network (for example, Radio Access Network, RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus.

A base station may be a base station (Base Transceiver Station, BTS) in GSM or CDMA, a base station (NodeB) in WCDMA, or an eNB or e-NodeB in LTE, which is not limited in the present invention.

Figure 1:
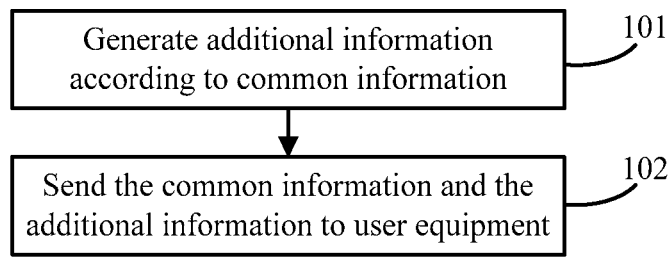
FIG. 1 is a schematic flowchart of a method for transmitting common information according to the present invention.

FIG. 1 is a schematic flowchart of a method for transmitting common information according to the present invention. The method in FIG. 1 is executed by a base station.

101. Generate additional information according to common information, where the common information is a paging message and/or system information, and data packets of the additional information and data packets of the common information are the same at a Media Access Control (Media Access Control, MAC) layer.

102. Send the common information and the additional information to user equipment.

According to the method in FIG. 1, when sending common information to user equipment, a base station further sends additional information to the user equipment, where data packets of the additional information and data packets of the common information are the same at a MAC layer. Thus, in a case of receiving the common information and the additional information, the user equipment may determine a data packet at the MAC layer according to the common information and the additional information; therefore a probability of correct detection of the common information may be increased.

Figure 2:
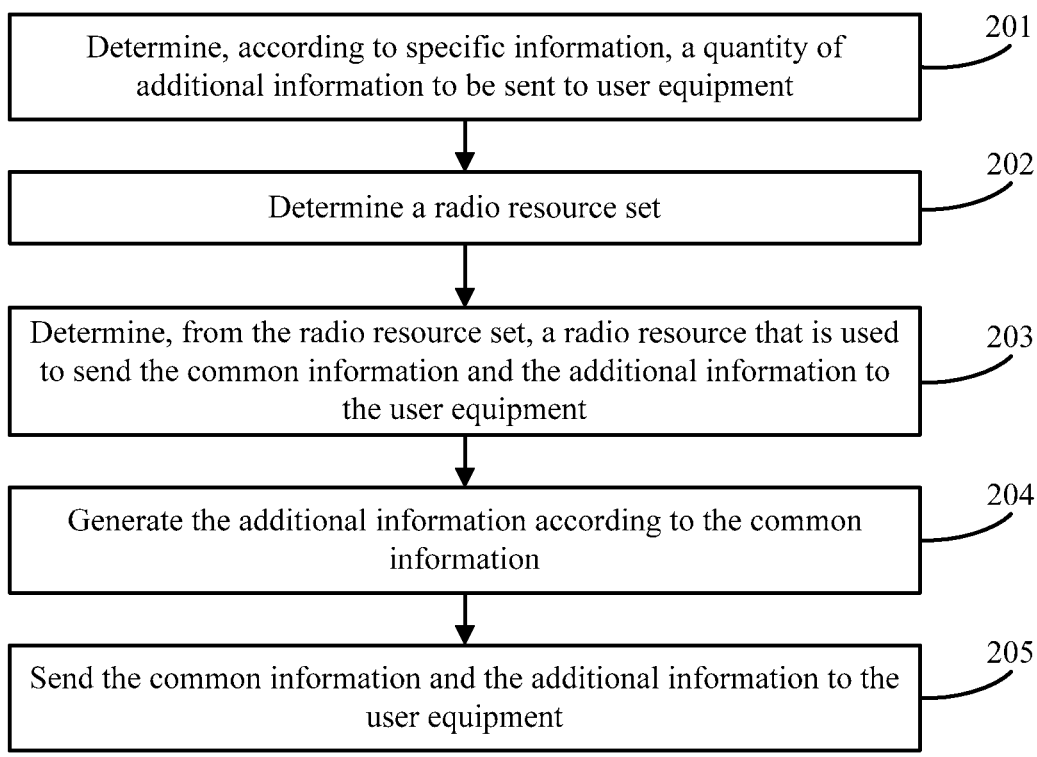
FIG. 2 is a schematic flowchart of a method for transmitting common information according to the present invention.

FIG. 2 is a schematic flowchart of a method for transmitting common information according to the present invention. The method in FIG. 2 is an embodiment of FIG. 1.

201. Determine, according to specific information, a quantity of additional information to be sent to user equipment, data packets of the additional information and data packets of the common information are the same at a MAC layer, so that performance of the user equipment in detecting the common information according to the additional information can be improved, where the common information is a paging message and/or system information, and the specific information includes one or more of the following: a wireless communication protocol, a parameter carried in a physical broadcast channel, and requirement information of the user equipment, where the wireless communication protocol includes communication protocols such as a LTE physical-layer or upper-layer protocol (a protocol that includes an existing release and also include a subsequent evolved release) and WCDMA, and the parameter carried in a physical broadcast channel includes system bandwidth (system bandwidth), a radio frame system frame number (system frame number), and the like.

Optionally, a specific rule may be designed in the wireless communication protocol to stipulate a quantity of times that the common information and the additional information that need to be sent. A base station may determine, according to the wireless communication protocol, the quantity of times that the additional information is to be sent to the user equipment. For example, if the wireless communication protocol stipulates that system information needs to be sent to the user equipment for N times, the base station sends the additional information to the user equipment for N−1 times, where N is a positive integer greater than 0.

Optionally, the parameter carried in a physical broadcast channel may include information about a quantity of times that the common information and the additional information are to be sent, and the base station may determine, according to the information about a quantity of times, the quantity of times that the additional information is to be sent to the user equipment. For example, if it is determined, in the parameter carried in a physical broadcast channel, that a paging message needs to be sent to the user equipment for N times, the base station sends the additional information to the user equipment for N−1 times, where N is a positive integer greater than 0.

Optionally, a specific rule may be designed in the wireless communication protocol to determine the quantity of times that the common information and the additional information need to be sent, and the rule may stipulate that the quantity of times that the common information and the additional information need to be sent is determined by using the parameter carried in a physical broadcast channel. For example, a specific formula may be designed in the wireless communication protocol to determine the quantity of times that the common information and the additional information need to be sent, and a parameter in the formula may be the parameter carried in a physical broadcast channel.

Optionally, the base station may acquire the requirement information of the user equipment, and the requirement information of the user equipment includes a quantity of times that the additional information is to be sent required by the user equipment. The base station may receive the requirement information of the user equipment, or may acquire the requirement information of the user equipment from a network side. The base station determines, according to the requirement information, the quantity of times that the additional information is to be sent to the user equipment.

202. Determine, according to the wireless communication protocol or the parameter carried in a physical broadcast channel, a radio resource set that can be used to send the common information and the additional information, where the radio resource set includes a radio frame.

Specifically, the radio resource set may consist of one radio frame that can be used to send the common information and the additional information, may consist of at least two consecutive radio frames that can be used to send the common information and the additional information, or may consist of at least two inconsecutive radio frames that can be used to send the common information and the additional information.

Optionally, in an embodiment, the determining a radio resource set according to the wireless communication protocol includes that: a specific rule may be designed in the wireless communication protocol to specify which wireless system frame and subframe may form the radio resource set. For example, in a case in which a system frame number of a radio frame satisfies the following formula, the radio frame may belong to the radio resource set:

$$\text{SFN mod } I = 0 \quad \quad \text{Formula 1.1}$$

SFN represents a radio frame system frame number (system frame number), mod represents a modulo operation, I represents a radio resource parameter, where the radio resource parameter may a parameter clearly specified in the wireless communication protocol and I is a positive integer greater than 0.

Optionally, in an embodiment, in a case in which the radio resource set is determined according to the parameter carried in a physical broadcast channel, in a case in which a system frame number of a radio frame satisfies formula 1.1, it may be determined that the radio frame may belong to the radio resource set. However, different from determining, according to the wireless communication protocol, the radio resource set that consists of at least one radio resource subset, in a case in which the radio resource set that consists of at least one radio resource subset is determined according to the parameter carried in a physical broadcast channel, I in formula 1.1 represents the parameter carried in a physical broadcast channel and I is a positive integer greater than 0.

Therefore, it can be understood that, in a case in which the radio resource set is determined according to the wireless communication protocol, I is clearly specified in the wireless communication protocol, and after the wireless communication protocol is determined, the parameter cannot be changed; and in a case in which the radio resource set is determined according to the parameter carried in a physical broadcast channel, I is the parameter carried in a physical broadcast channel, and I may vary with the parameter carried in a physical broadcast channel.

203. Determine, from the radio resource set, a radio resource to be used to send the common information and the additional information to the user equipment.

Specifically, in a case in which the common information is a paging message, the base station determines, from the radio resource set according to the requirement information of the user equipment and an identifier ID of the user equipment, the radio resource to be used to send the common information and the additional information to the user equipment; and in a case in which the common information is system information, the base station determines, from the radio resource set according to the wireless communication protocol and/or the parameter carried in a physical broadcast channel, the radio resource to be used to send the common information and the additional information to the user equipment.

Optionally, the base station may determine, according to the requirement information of the user equipment, to use one or more radio frames to send the common information and the additional information. Specifically, the base station may determine, according to the requirement information of the user equipment, to use one radio frame to send the common information and the additional information to the user equipment, and the base station may further determine, according to the requirement information of the user equipment, to use at least two radio frames to send the common information and the additional information to the user equipment. Optionally, in a case in which at least two radio frames are used to send the common information and the additional information, the base station may use one radio frame of the at least two radio frames to send the common information and use a remaining radio frame of the at least two radio frames to send the additional information, and the base station may further use one radio frame of the at least two radio frames to send the common information and the additional information and use a remaining radio frame of the at least two radio frames to send the additional information.

Optionally, when the common information is a paging message, and in a case in which the base station determines to use one radio frame to send the common information and the additional information to the user equipment, the base station may determine, from the radio resource set according to the ID of the user equipment, a system frame number of a radio frame to be used to send the common information and the additional information to the user equipment, where the radio frame is a radio frame that can be used to send the common information and the additional information in the radio resource set.

Optionally, when the common information is a paging message, and in a case in which the base station determines to use at least two radio frames to send the common information and the additional information to the user equipment, the base station may determine, from the radio resource set according to the ID of the user equipment, a system frame number of each radio frame in the at least two radio frames, where the at least two radio frames are radio frames that can be used to send the common information and the additional information in the radio resource set. Optionally, in a case in which the at least two radio frames are two consecutive radio frames, the base station may determine, from the radio resource set according to the ID of the user equipment, a system frame number of a first radio frame in the at least two frames, and determine a system frame number of another radio frame according to a quantity of radio frames that need to be used.

Further, when the common information is a paging message, and in a case in which a system frame of the one or more radio frames that are used to send the common information and the additional information to the user equipment is determined, the base station determines, according to the requirement information of the user equipment and the ID of the user equipment, a subframe number of the common information and/or the additional information in the one or more radio frames, or further determine a frequency domain resource location of a subframe corresponding to the subframe number.

Optionally, in a case in which at least two consecutive subframes in a radio frame can be used to send the common information and the additional information, the base station may determine a subframe number of a first subframe and determine, according to the quantity of times that the common information and the additional information are to be sent, a subframe number of another subframe that can be used to send the common information and/or the additional information.

204. Generate the additional information according to the common information.

It should be noted that step 204 may be performed before any step of step 201 to step 203 or performed at the same time as any step of step 201 to step 203.

Specifically, the base station may generate, in a physical layer channel modulation and coding scheme, the additional information by using original information bits the same as those of the common information and coding redundant bits whose version is different from that of coding redundant bits of the common information; or the base station may generate the additional information in a resource mapping manner that ensures a same effective bit rate as that of the common information; or the base station may generate the additional information in a channel coding and signal modulation scheme the same as that of the common information; or the base station may generate the additional information in a resource mapping manner that ensures a same effective bit rate as that of the common information and in a channel coding and signal modulation scheme the same as that of the common information; or the base station may generate the additional information in a resource mapping manner that ensures a same effective bit rate as that of the common information and by mapping to a frequency domain resource location the same as that of the common information.

205. Send the common information and the additional information to the user equipment.

According to the method in FIG. 2, when sending common information to user equipment, a base station further sends additional information to the user equipment, where data packets of the additional information and data packets of the common information are the same at a MAC layer. Thus, in a case of receiving the common information and the additional information, the user equipment may determine a data packet at the MAC layer by combining the common information and the additional information; therefore a probability of correct detection of the common information may be increased.

Figure 3:
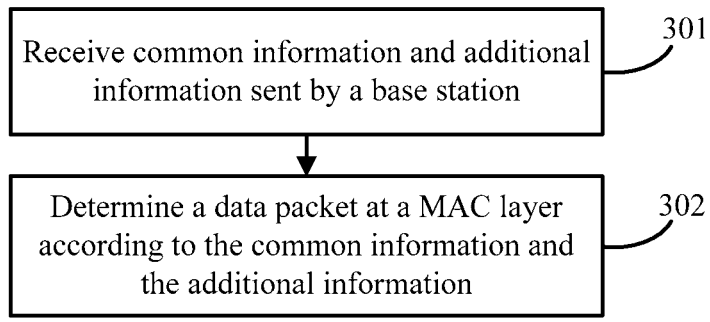
FIG. 3 is a schematic flowchart of a method for transmitting common information according to the present invention.

FIG. 3 is a schematic diagram of a method for transmitting common information according to the present invention, and the method in FIG. 3 is executed by user equipment.

301. Receive common information and additional information sent by a base station, where the common information is a paging message and/or system information, and data packets of the additional information and data packets of the common information are the same at a MAC layer.

302. Determine a data packet at the MAC layer according to the common information and the additional information.

According to the method in FIG. 3, when receiving common information, user equipment may further receive additional information, where data packets of the additional information and data packets of the common information are the same at a MAC layer. Thus, in a case of receiving the common information and the additional information, the user equipment may determine a data packet at the MAC layer according to the common information and the additional information; therefore a probability of correct detection of the common information may be increased.

Figure 4:
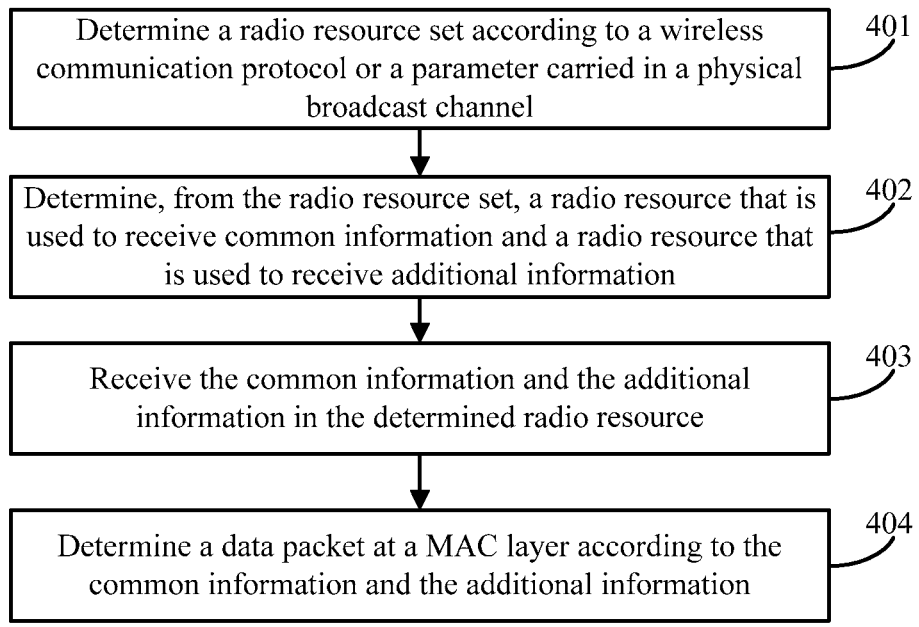
FIG. 4 is a schematic flowchart of a method for transmitting common information according to the present invention.

FIG. 4 is a schematic flowchart of a method for transmitting common information according to the present invention. FIG. 4 is an embodiment of FIG. 3.

Step 401 and step 402 is used to determine a radio resource that is used to receive the common information and a radio resource that is used to receive additional information, where the common information is a paging message and/or system information, and data packets of the additional information and data packets of the common information are the same at a MAC layer.

401. Determine, according to a wireless communication protocol or a parameter carried in a physical broadcast channel, a radio resource set that can receive the common information and/or the additional information, where the radio resource set includes a radio frame.

Specifically, the radio resource set may consist of one radio frame that can receive the common information and/or the additional information, may consist of at least two consecutive radio frames that can receive the common information and/or the additional information, or may consist of at least two inconsecutive radio frames that can receive the common information and/or the additional information.

Optionally, in an embodiment, the determining a radio resource set according to a wireless communication protocol includes that: a specific rule may be designed in the wireless communication protocol to specify which wireless system frame and subframe may form the radio resource set. For example, in a case in which a system frame number of a radio frame satisfies the following formula, the radio frame may belong to the radio resource set:

$$\text{SFN mod I}=0 \qquad \text{Formula 2.1}$$

SFN represents a radio frame system frame number (system frame number), mod represents a modulo operation, I represents a radio resource parameter, where the radio resource parameter is clearly specified in the wireless communication protocol and I is a positive integer greater than 0.

Optionally, in an embodiment, in a case in which the radio resource set is determined according to the parameter carried in a physical broadcast channel, in a case in which a system frame number of a radio frame satisfies formula 2.1, it may be determined that the radio frame may belong to the radio resource set. However, different from determining, according to the wireless communication protocol, the radio resource set that consists of at least one radio resource subset, in a case in which the radio resource set that consists of at least one radio resource subset is determined according to the parameter carried in a physical broadcast channel, I in formula 2.1 represents the parameter carried in a physical broadcast channel and I is a positive integer greater than 0.

Therefore, it can be understood that, in a case in which the radio resource set that consists of at least one radio resource subset is determined according to the wireless communication protocol, I is clearly specified in the wireless communication protocol, and after the wireless communication protocol is determined, the parameter cannot be changed; and in a case in which the radio resource set that consists of at least one radio resource subset is determined according to the parameter carried in a physical broadcast channel, I is the parameter carried in a physical broadcast channel, and I may vary with the parameter carried in a physical broadcast channel.

402. Determine, from the radio resource set, a radio resource that is used to receive the common information and a radio resource that is used to receive the additional information.

Specifically, in a case in which the common information is a paging message, the user equipment determines, from the radio resource set according to requirement information and an identifier (ID) of the user equipment, the radio resource that is used to receive the common information and/or the additional information, where the requirement information includes a quantity of times that the additional information is to be sent required by the user equipment. In a case in which the common information is system information, the user equipment determines, from the radio resource set according to the wireless communication protocol and/or the parameter carried in a physical broadcast channel, the radio resource that is used to receive the common information and/or the additional information.

Optionally, the user equipment may determine, according to the requirement information, to receive the common information and the additional information in one or more radio frames. Specifically, the user equipment may determine, according to the requirement information, to receive, in one radio frame, the common information and the additional information sent by the base station, and the user equipment may further determine, according to the requirement information, to receive, in at least two radio frames, the common information and the additional information sent by the base station. Optionally, in a case in which the common information and the additional information are received in at least two radio frames, the user equipment may receive the common information in one radio frame of the at least two radio frames, and receive the additional information in a remaining radio frame of the at least two radio frames, and the base station may further receive the common information and the additional information in one radio frame of the at least two radio frames and receive the additional information in a remaining radio frame of the at least two radio frames.

Optionally, when the common information is a paging message, and in a case in which the user equipment determines to receive, in one radio frame, the common information and the additional information sent by the base station, the user equipment may determine, from the radio resource set according to the ID of the user equipment, a system frame number of a radio frame that is used to receive the common information and the additional information.

Optionally, when the common information is a paging message, and in a case in which the user equipment determines to receive, in at least two radio frames, the common information and the additional information sent by the base station, the user equipment may determine, from the radio resource set according to the ID of the user equipment, a system frame number of each radio frame in the at least two radio frames. Optionally, in a case in which the at least two radio frames are two consecutive radio frames, the user equipment may determine, from the radio resource set according to the ID of the user equipment, a system frame number of a first radio frame in the at least two frames, and determine a system frame number of another radio frame according to a determined quantity of radio frames.

Further, when the common information is a paging message, and in a case in which the user equipment determines the system frame number of the radio frame that is used to receive the common information and the additional information, the user equipment determines, according to the requirement information and the ID of the user equipment, a subframe number of the common information and the additional information in the radio frame whose system frame number has already been determined, or further determines a frequency domain resource location of a subframe corresponding to the subframe number.

Optionally, in a case in which at least two consecutive subframes in the radio frame can be used to receive the common information and the additional information, the user equipment may determine a subframe number of a first subframe, and determine, according to a quantity of subframes that need to receive the common information and the additional information, a subframe number of another subframe that may receive the common information and the additional information.

403. Receive the common information and the additional information in the determined radio resource.

404. Determine a data packet at the MAC layer according to the common information and the additional information.

Specifically, in a case in which the common information and the additional information are generated by using same original information bits and coding redundant bits of different versions in a physical layer modulation and coding scheme, during decoding, the user equipment obtains, by joint decoding, the original information bits with reference to the coding redundant bits of different versions from different additional information, so as to determine the data packet at the MAC layer, thereby increasing accuracy of decoding the common information.

In a case in which the common information and the additional information are generated in a resource mapping manner that ensures a same effective bit rate, the user equipment may obtain, by demodulation and decoding, soft bit information separately from the common information and each piece of additional information, and then accumulate the soft bit information, so as to determine the data packet at the MAC layer, thereby increasing accuracy of decoding the common information.

In a case in which the common information and the additional information are generated in a resource mapping manner that ensures a same effective bit rate, the user equipment may estimate originally sent signals from the common information and each piece of additional information, and then accumulate the estimated originally sent signals, and then perform demodulation and decoding, so as to determine the data packet at the MAC layer, thereby increasing the accuracy of decoding the common information; or the user equipment may obtain, by demodulation and decoding, soft bit information separately from the common information and each piece of additional information, and then accumulate the soft bit information, so as to determine the data packet at the MAC layer, thereby increasing the accuracy of decoding the common information.

In a case in which the common information and the additional information are generated in a resource mapping manner that ensures a same effective bit rate and in a same channel coding and signal modulation scheme, the user equipment may first estimate originally sent signals from the common information and each piece of additional information, and then accumulate the estimated originally sent signals, and then perform demodulation and decoding, so as to determine the data packet at the MAC layer, thereby increasing the accuracy of decoding the common information; or the user equipment may obtain, by demodulation and decoding, soft bit information separately from the common information and each piece of additional information, and then accumulate the soft bit information, so as to determine the data packet at the MAC layer, thereby increasing the accuracy of decoding the common information.

In a case in which the common information and the additional information are generated in a resource mapping manner that ensures a same effective bit rate and by mapping to a same frequency domain resource location, the user equipment may first estimate originally sent signals from the common information and each piece of additional information, and then accumulate the estimated originally sent signals, and then perform demodulation and decoding, so as to determine the data packet at the MAC layer, thereby increasing the accuracy of decoding the common information; or the user equipment may obtain, by demodulation and decoding, soft bit information separately from the common information and each piece of additional information, and then accumulate the soft bit information, so as to determine the data packet at the MAC layer, thereby increasing the accuracy of decoding the common information; or the user equipment may directly combine signals that are received in a same frequency domain resource location, and estimate a sent signal according to the received signals, and then demodulate the sent signal, so as to determine the data packet at the MAC layer, thereby increasing the accuracy of decoding the common information.

According to the method in FIG. 4, when receiving common information, user equipment may further receive additional information, where data packets of the additional information and data packets of the common information are the same at a MAC layer. Thus, in a case of receiving the common information and the additional information, the user equipment may determine a data packet at the MAC layer according to the common information and the additional information; therefore a probability of correct detection of the common information may be increased.

FIG. 5a to FIG. 5g are examples of the radio resource that is used to transmit the common information and the additional information and is determined according to the method in FIG. 2 or FIG. 4.

Figure 5A:
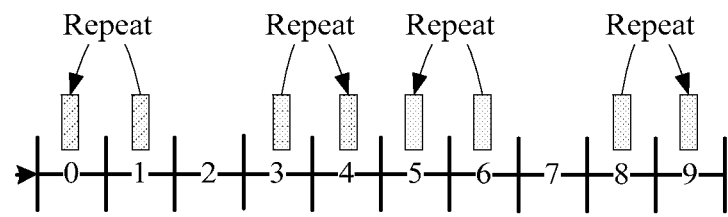
FIG. 5a is a first schematic structural diagram of a radio frame that is used to transmit common information and additional information.

FIG. 5a is a first schematic structural diagram of a radio frame that is used to transmit common information and additional information, and the common information is a paging message. As shown in FIG. 5a, a base station uses one radio frame to transmit the common information and the additional information. The base station determines according to specific information that additional information corresponding to the paging message needs to be sent to user equipment once. The base station determines to use, from a radio resource set, a radio resource subset that consists of one radio frame to send the paging message and the additional information to the user equipment. The base station determines a system frame number of the radio frame in the radio resource subset according to an ID of the user equipment. According to the ID of the user equipment and requirement information of the user equipment, the base station determines that the paging message may be sent to the user equipment in subframe 0 of the radio frame, and determines that the additional information may be sent to the user equipment in subframe 1 of the radio frame.

Optionally, as shown in FIG. 5a, a same radio resource subset that consists of one radio frame may be used to send a paging message corresponding to different user equipment. For example, for UE 1, a paging message may be sent in subframe 0 and additional information corresponding to the paging message may be sent in subframe 1; for UE 2, a paging message may be sent in subframe 4 and additional information corresponding to the paging message may be sent in subframe 3; for UE 3, a paging message may be sent in subframe 5 and additional information corresponding to the paging message may be sent in subframe 6; for UE 4, a paging message may be sent in subframe 9 and additional information corresponding to the paging message may be sent in subframe 8.

Figure 5B:
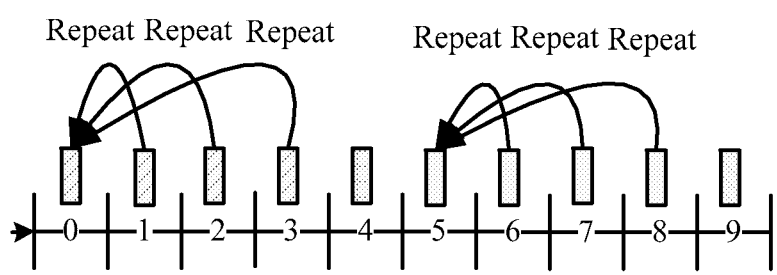
FIG. 5b is a second schematic structural diagram of a radio frame that is used to transmit common information and additional information.

FIG. 5b is a second schematic structural diagram of a radio frame that is used to transmit common information and additional information, and the common information is a paging message. As shown in FIG. 5b, a base station uses one radio frame to transmit the common information and the additional information. The base station determines, according to specific information, to send the additional information corresponding to the paging message to user equipment for three times. The base station determines to use, from a radio resource set, a radio resource subset that consists of one radio frame to send the paging message and the additional information to the user equipment. The base station determines a system frame number of the radio frame in the radio resource subset according to an ID of the user equipment. According to the ID of the user equipment and requirement information of the user equipment, the base station determines that the paging message may be sent in subframe 0, and determines that the additional information may be sent in subframes 1, 2, and 3.

Optionally, as shown in FIG. 5b, a same radio resource subset that consists of one radio frame may be used to send a paging message corresponding to different user equipment. For example, for UE 1, a paging message may be sent in subframe 0 and additional information corresponding to the paging message may be separately sent in subframes 1, 2, and 3; for UE 2, a paging message may be sent in subframe 4 and additional information corresponding to the paging message is not sent; for UE 3, a paging message may be sent in subframe 5 and additional information corresponding to the paging message may be separately sent in subframes 6, 7, and 8; for UE 4, a paging message may be sent in subframe 9 and additional information corresponding to the paging message is not sent.

Figure 5C:
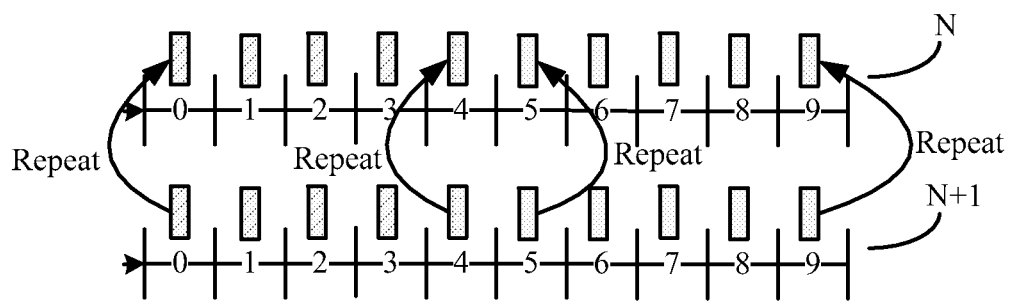
FIG. 5c is a third schematic structural diagram of a radio frame that is used to transmit common information and additional information.

FIG. 5c is a third schematic structural diagram of a radio frame that is used to transmit common information and additional information, and the common information is a paging message. As shown in FIG. 5c, a base station uses multiple radio frames to transmit the common information and the additional information. The base station determines, according to specific information, that the additional information corresponding to the paging message needs to be sent to user equipment once. The base station determines to use, from a radio resource set, a radio resource subset that consists of two radio frames to send the paging message and the additional information to the user equipment. The base station determines system frame numbers of the radio frames in the radio resource subset according to an ID of the user equipment. The base station determines, according to the ID of the user equipment and requirement information of the user equipment, a system frame number of a radio frame to be used to send the paging message and the additional information, for example, it may be determined that the paging message is sent in a radio frame with a system frame number being N and the additional information is sent in a radio frame with a system frame number being N+1, where N is an integer greater than 0. Further, according to the ID of the user equipment and requirement information of the user equipment, the base station determines that the paging message may be sent to the user equipment in subframe 0 of the radio frame with the system frame number being N, and determines that the additional information may be sent to the user equipment in subframe 0 of the radio frame with the system frame number being N+1.

Optionally, as shown in FIG. 5c, a radio frame may be used to send a paging message corresponding to different user equipment, and another radio frame may be used to send additional information that corresponds to different user equipment and corresponds to the paging message, where the radio frame to be used to send the paging message and the radio frame to be used to send the additional information form the radio resource subset. For example, for UE 1, a paging message may be sent in subframe 0 of the radio frame with the system frame number being N and additional information may be sent in subframe 0 of the radio frame with the system frame number being N+1; for UE 2, a paging message may be sent in subframe 4 of the radio frame with the system frame number being N and additional information may be sent in subframe 4 of the radio frame with the system frame number being N+1; for UE 3, a paging message may be sent in subframe 5 of the radio frame with the system frame number being N and additional information may be sent in subframe 5 of the radio frame with the system frame number being N+1; for UE 4, a paging message may be sent in subframe 9 of the radio frame with the system frame number being N and additional information may be sent in subframe 9 of the radio frame with the system frame number being N+1.

Figure 5D:
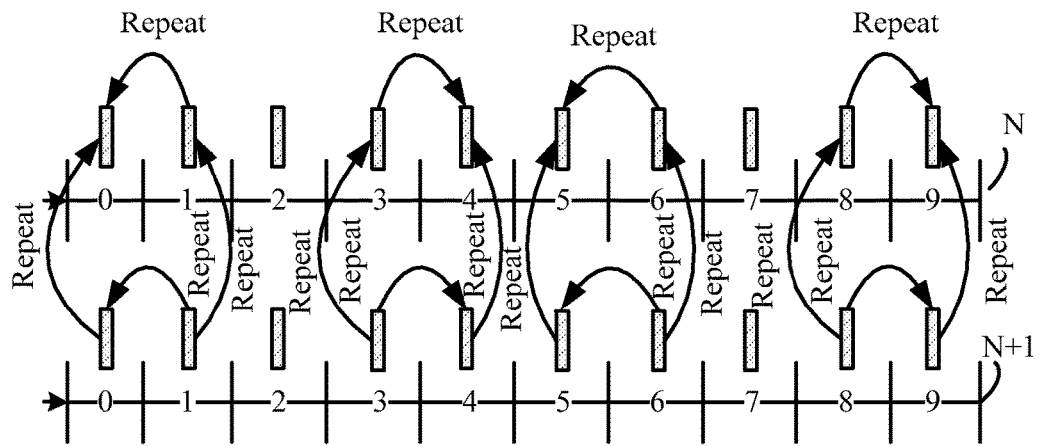
FIG. 5d is a fourth schematic structural diagram of a radio frame that is used to transmit common information and additional information.

FIG. 5d is a fourth schematic structural diagram of a radio frame that is used to transmit common information and additional information, and the common information is a paging message. As shown in FIG. 5d, a base station uses multiple radio frames to transmit the common information and the additional information. The base station determines, according to specific information, that the additional information corresponding to the paging message needs to be sent to user equipment for three times. The base station determines to use, from a radio resource set, a radio resource subset that consists of two radio frames to send the paging message and the additional information to the user equipment. The base station determines system frame numbers of the radio frames in the radio resource subset according to an ID of the user equipment. The base station determines, according to the ID of the user equipment and requirement information of the user equipment, a system frame number of a radio frame to be used to send the paging message and the additional information, for example, it may be determined that the paging message and the additional information are sent in a radio frame with a system frame number being N and the additional information is sent in a radio frame with a system frame number being N+1, where N is an integer greater than 0. Further, according to the ID of the user equipment and requirement information of the user equipment, the base station determines that the paging message may be sent to the user equipment in subframe 0 of the radio frame with the system frame number being N, determines that the additional information may be sent to the user equipment in subframe 1 of the radio frame with the system frame number being N, and determines that the additional information may be sent to the user equipment in subframes 0 and 1 of the radio frame with the system frame number being N+1.

Optionally, as shown in FIG. 5d, a radio frame may be used to send a paging message and additional information that correspond to different user equipment, and another radio frame may be used to send the additional information that corresponds to different user equipment and corresponds to the paging message, where the radio frame to be used to send the paging message and the radio frame to be used to send the additional information form the radio resource subset. For example, for UE1, a paging message may be sent in subframe 0 of the radio frame with the system frame number being N, additional information may be sent in subframe 1 of the radio frame with the system frame number being N, the additional information may be sent in subframe 0 of the radio frame with the system frame number being N+1, and the additional information may be sent in subframe 1 of the radio frame with the system frame number being N+1; for UE2, a paging message may be sent in subframe 4 of the radio frame with the system frame number being N, additional information may be sent in subframe 3 of the radio frame with the system frame number being N, the additional information may be sent in subframe 3 of the radio frame with the system frame number being N+1, and the additional information may be sent in subframe 4 of the radio frame with the system frame number being N+1; for UE3, a paging message may be sent in subframe 5 of the radio frame with the system frame number being N, additional information may be sent in subframe 6 of the radio frame with the system frame number being N, the additional information may be sent in subframe 5 of the radio frame with the system frame number being N+1, and the additional information may be sent in subframe 6 of the radio frame with the system frame number being N+1; for UE3, a paging message may be sent in subframe 9 of the radio frame with the system frame number being N, additional information may be sent in subframe 8 of the radio frame with the system frame number being N, the additional information may be sent in subframe 8 of the radio frame with the system frame number being N+1, and the additional information may be sent in subframe 9 of the radio frame with the system frame number being N+1.

Figure 5E:
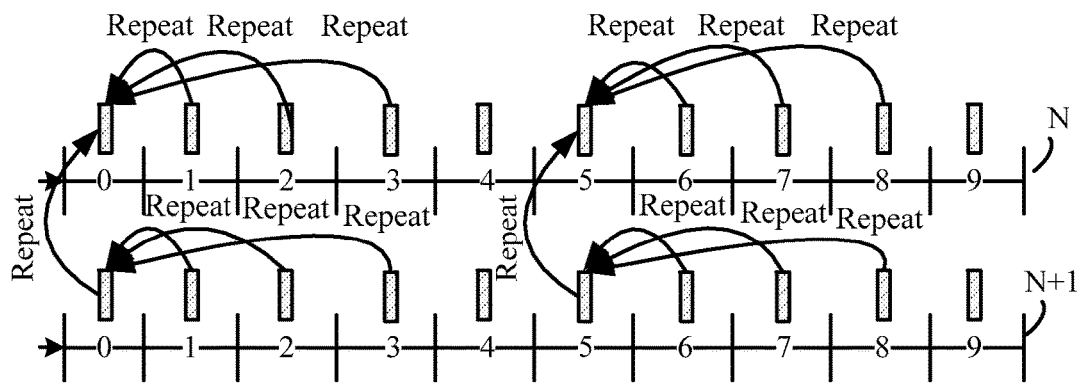
FIG. 5e is a fifth schematic structural diagram of a radio frame that is used to transmit common information and additional information.

FIG. 5a is a fifth schematic structural diagram of a radio frame that is used to transmit common information and additional information, and the common information is a paging message. As shown in FIG. 5e, a base station uses multiple radio frames to transmit the common information and the additional information. The base station determines, according to specific information, that the additional information corresponding to the paging message needs to be sent to the user equipment for seven times. The base station determines to use, from a radio resource set, a radio resource subset that consists of two radio frames to send the paging message and the additional information to the user equipment. The base station determines system frame numbers of the radio frames in the radio resource subset according to an ID of the user equipment. The base station determines, according to the ID of the user equipment and requirement information of the user equipment, a system frame number of a radio frame to be used to send the paging message and the additional information, for example, it may be determined that the paging message is sent in a radio frame with a system frame number being N and the additional information is sent in a radio frame with a system frame number being N+1, where N is an integer greater than 0. Further, according to the ID of the user equipment and requirement information of the user equipment, the base station determines that the paging message may be sent to the user equipment in subframe 0 of the radio frame with the system frame number being N, determines that the additional information may be sent to the user equipment in subframes 1, 2, and 3 of the radio frame with the system frame number being N, and determines that the additional information may be sent to the user equipment in subframes 0, 1, 2, and 3 of the radio frame with the system frame number being N+1.

Optionally, as shown in FIG. 5e, for multiple user equipments, in a case in which subframes that can be used to send a paging message are the same for the multiple user equipments, a radio frame may be used to send a paging message and additional information and another radio frame may be used to send the additional information corresponding to the paging message, where the radio frame to be used to send the paging message and the radio frame to be used to send the additional information form the radio resource subset. For example, for UE 1, a paging message may be sent to the user equipment in subframe 0 of the radio frame with the system frame number being N, additional information may be separately sent to the user equipment in subframes 1, 2, and 3 of the radio frame with the system frame number being N, and the additional information may be separately sent to the user equipment in subframes 0, 1, 2, and 3 of the radio frame with the system frame number being N+1; for UE 2, a paging message may be sent in subframe 4 of the radio frame with the system frame number being N and additional information may be sent in subframe 4 of the radio frame with the system frame number being N+1; for UE 3, a paging message may be sent in subframe 5 of the radio frame with the system frame number being N, additional information may be separately sent in subframes 6, 7, and 8 of the radio frame with the system frame number being N, and the additional information may be separately sent in subframes 5, 6, 7, and 8 of the radio frame with the system frame number being N+1; for UE 4, a paging message may be sent in subframe 9 of the radio frame with the system frame number being N and additional information may be sent in subframe 9 of the radio frame with the system frame number being N+1.

Figure 5F:
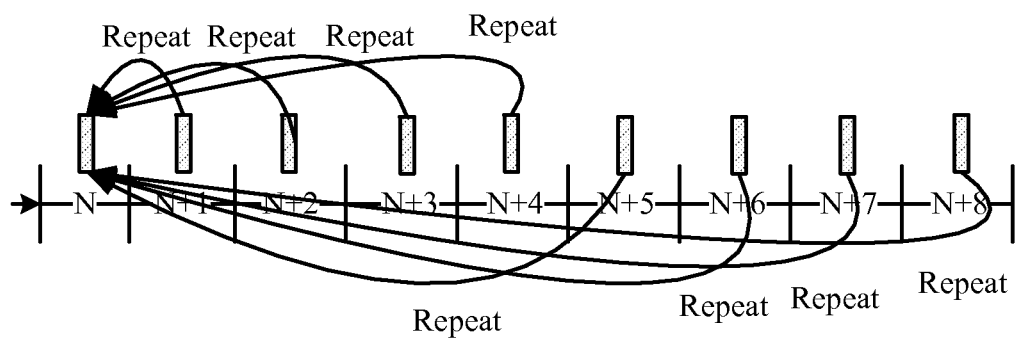
FIG. 5f is a sixth schematic structural diagram of a radio frame that is used to transmit common information and additional information.

FIG. 5f is a sixth schematic structural diagram of a radio frame that is used to transmit common information and additional information, and the common information is system information. A base station determines to use, from a radio resource set, a radio resource subset that consists of eight radio frames to send the system information and the additional information to user equipment. The base station determines system frame numbers of the radio frames in the radio resource subset according to a wireless communication protocol and/or a parameter carried in a physical broadcast channel. As shown in FIG. 5f, system information may be sent in a radio frame with a system frame number being N, additional information of the system information may be separately sent in radio frames with system frame numbers being N+1, N+2, N+3, N+4, N+5, N+6, N+7, and N+8, where N is an integer greater than 0.

Optionally, it may be determined that the common information is sent in any subframe of the radio frame with the system frame number being N, and it may be determined that the additional information corresponding to the common information is sent in a subframe whose subframe number is the same as that of the subframe used to send the common information and is of the radio frames with the system frame numbers being N+1, N+2, N+3, N+4, N+5, N+6, N+7, and N+8. For example, it is determined that the common information is sent in subframe 5 of the radio frame with the system frame number being N, and it may be determined that the additional information is sent in subframe 5 of the radio frames with the system frame numbers being N+1, N+2, N+3, N+4, N+5, N+6, N+7, and N+8.

Optionally, it may be determined that the common information is sent in any subframe of the radio frame with the system frame number being N, it may be determined that the additional information corresponding to the common information is sent in a subframe other than the subframe used to send the common information and of the radio frame with the system frame number being N, and it may be determined that the additional information is sent in a every subframe of the radio frames with the system frame numbers being N+1, N+2, N+3, N+4, N+5, N+6, N+7, and N+8.

Figure 5G:
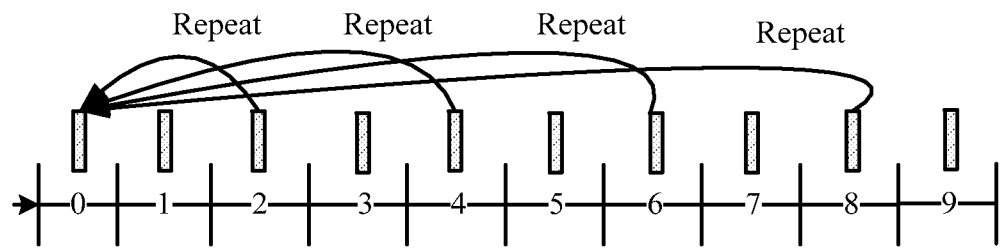
FIG. 5g is a seventh schematic structural diagram of a radio frame that is used to transmit common information and additional information.

FIG. 5g is a seventh schematic structural diagram of a radio frame that is used to transmit common information and additional information, and the common information is system information. The base station determines to use, from a radio resource set, a radio resource subset that consists of one radio frame to send the system information and the additional information to user equipment. The base station determines a system frame number of the radio frame in the radio resource subset according to a wireless communication protocol and/or a parameter carried in a physical broadcast channel. As shown in FIG. 5g, system information and additional information corresponding to the system information may be sent in a radio frame with a system frame number being N, where N is an integer greater than 0. Specifically, the system information may be sent in subframe 0 of the radio frame with the system frame number being N and the additional information may be sent in subframes 2, 4, 6, and 8 of the radio frame with the system frame number being N.

It should be noted that, schematic structural diagrams of a radio frame in FIG. 5a to FIG. 5g are only schematic diagrams of a radio frame used to transmit the common information in the present invention, and the protection scope, determined according to the method in the present invention, of the radio frame is not limited to the radio frames in FIG. 5a to FIG. 5g.

Figure 6:
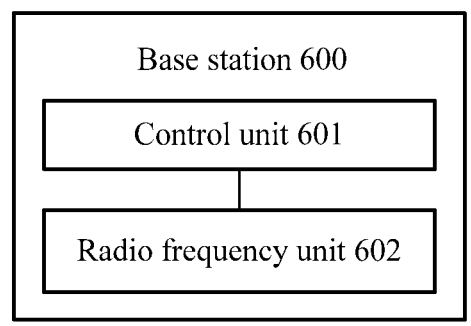
FIG. 6 is a schematic structural diagram of a base station according to the present invention.

FIG. 6 is a schematic structural diagram of a base station according to the present invention. A base station 600 shown in FIG. 6 may execute all steps executed by a base station in FIG. 1. The base station 600 includes a control unit 601 and a radio frequency unit 602.

The control unit 601 is configured to generate additional information according to common information, where the common information is a paging message and/or system information, data packets of the additional information and data packets of the common information are the same at a MAC layer.

The radio frequency unit 602 is configured to send the common information and the additional information to user equipment.

According to the base station in FIG. 6, when sending common information to user equipment, a base station 600 further sends additional information to the user equipment, where data packets of the additional information and data packets of the common information are the same at a MAC layer. Thus, in a case of receiving the common information and the additional information, the user equipment may determine a data packet at the MAC layer according to the common information and the additional information; therefore a probability of correct detection of the common information may be increased.

Figure 7:
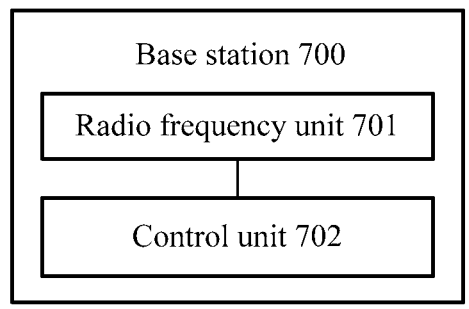
FIG. 7 is a schematic structural diagram of a base station according to the present invention.

FIG. 7 is a schematic structural diagram of a base station according to the present invention; A base station 700 shown in FIG. 7 may execute all steps executed by a base station in FIG. 1 or FIG. 2. The base station 700 includes a radio frequency unit 701 and a control unit 702.

The control unit 702 is configured to determine, according to specific information, a quantity of additional information to be sent to user equipment, where data packets of the additional information and common information are the same at a MAC layer, so that performance of the user equipment in detecting the common information according to the additional information can be improved, where the common information is a paging message and/or system information, and the specific information includes one or more of the following: a wireless communication protocol, a parameter carried in a physical broadcast channel and requirement information of the user equipment.

The control unit 702 is configured to acquire the requirement information of the user equipment, where the requirement information of the user equipment includes a quantity of times that the additional information is to be sent required by the user equipment. Specifically, the control unit 702 may acquire, by using the radio frequency unit 701, the requirement information sent by the user equipment, or may acquire the requirement information of the user equipment from a network side.

Optionally, a specific rule may be designed in the wireless communication protocol to stipulate a quantity of times that the common information and the additional information need to be sent. The control unit 702 may determine, according to the rule of the wireless communication protocol, the quantity of times that the additional information is to be sent to the user equipment. For example, if the wireless communication protocol stipulates that system information needs to be sent to the user equipment for N times, the control unit 702 determines to send the additional information to the user equipment for N−1 times, where N is a positive integer greater than 0.

Optionally, the parameter carried in a physical broadcast channel may include information about a quantity of times that the common information and the additional information are to be sent, and the control unit 702 may determine, according to the information about a quantity of times, the quantity of times that the additional information is to be sent to the user equipment. For example, if it is determined, in the parameter carried in a physical broadcast channel, that a paging message needs to be sent to the user equipment for N times, the control unit 702 determines to send the additional information to the user equipment for N−1 times, where N is a positive integer greater than 0.

Optionally, a specific rule may be designed in the wireless communication protocol to determine the quantity of times that the common information and the additional information need to be sent, and the rule may stipulate that the quantity of times that the common information and the additional information need to be sent is determined by using the parameter carried in a physical broadcast channel. The control unit 702 may determine, according to the rule and the parameter carried in a physical broadcast channel, the quantity of times that the common information and the additional information are to be sent. For example, a specific formula may be designed in the wireless communication protocol to determine the quantity of times that the common information and the additional information need to be sent, and a parameter in the formula may be the parameter carried in a physical broadcast channel.

Optionally, the control unit 702 may determine, according to the acquired requirement information of the user equipment, the quantity of times that the additional information is to be sent to the user equipment.

The control unit 702 is further configured to determine a radio resource set that can be used to send the common information and the additional information, where the radio resource set includes a radio frame.

The control unit 702 is further configured to determine, from the radio resource set, a radio resource to be used to send the common information and the additional information to the user equipment, where the radio resource belongs to the radio resource set.

In a case in which the common information is a paging message, the control unit 702 is specifically configured to determine, from the radio resource set according to the requirement information of the user equipment and an ID of the user equipment, the radio resource to be used to send the common information and the additional information to the user equipment, the radio resource belongs to the radio resource set.

In a case in which the common information is system information, the control unit 702 is specifically configured to determine, from the radio resource set according to the wireless communication protocol and/or the parameter carried in a physical broadcast channel, the radio resource to be used to send the common information and the additional information to the user equipment, the radio resource belongs to the radio resource set.

Optionally, the control unit 702 may be configured to determine, according to the requirement information of the user equipment, to use one or more radio frames to send the common information and the additional information. Specifically, the control unit 702 may be configured to determine, according to the requirement information of the user equipment, to use one radio frame to send the common information and the additional information to the user equipment. The control unit 702 may further be configured to determine to use at least two radio frames to send the common information and the additional information to the user equipment. Optionally, in a case in which at least two radio frames are used to send the common information and the additional information, the control unit 702 may determine to use one radio frame of the at least two radio frames to send the common information and use a remaining radio frame of the at least two radio frames to send the additional information, and the control unit 702 may further determine to use one of the at least two radio frames to send the common information and the additional information and use a remaining radio frame of the at least two radio frames to send the additional information.

Optionally, when the common information is a paging message, and in a case in which it is determined that a radio resource subset that consists of one radio frame is used to send the common information and the additional information to the user equipment, the control unit 702 may further be configured to determine, from the radio resource set according to the ID of the user equipment, a system frame number of a radio frame to be used to send the common information and the additional information.

Optionally, when the common information is a paging message, and in a case in which it is determined that at least two radio frames are used to send the common information and the additional information to the user equipment, the control unit 702 may further be configured to determine, from the radio resource set according to the ID of the user equipment, a system frame number of each radio frame in the at least two radio frames. Optionally, in a case in which the at least two radio frames are two consecutive radio frames, the control unit 702 may further be configured to determine, from the radio resource set according to the ID of the user equipment, a system frame number of a first radio frame in the at least two frames, and determine a system frame number of another radio frame according to a quantity of radio frames that need to be used.

Further, when the common information is a paging message, and in a case in which the system frame number of the radio frame to be used to send the common information and the additional information is determined, the control unit 702 may further be configured to determine, according to the requirement information of the user equipment and the ID of the user equipment, a subframe number of the common information and/or the additional information in the radio frame whose system frame number has already been determined, or further determines a frequency domain resource location of a subframe corresponding to the subframe number.

The control unit 702 is further configured to generate the additional information according to the common information.

Specifically, the control unit 702 may generate, in a physical layer channel modulation and coding scheme, the additional information by using original information bits the same as those of the common information and coding redundant bits whose version is different from that of coding redundant bits of the common information; or the control unit 702 may generate the additional information in a resource mapping manner that ensures a same effective bit rate as that of the common information; or the control unit 702 may generate the additional information in a channel coding and signal modulation scheme the same as that of the common information; or the control unit 702 may generate the additional information in a resource mapping manner that ensures a same effective bit rate as that of the common information and in a channel coding and signal modulation scheme the same as that of the common information; or the control unit 702 may generate the additional information in a resource mapping manner that ensures a same effective bit rate as that of the common information and by mapping to a frequency domain resource location the same as that of the common information.

The radio frequency unit 701 is configured to send the common information and the additional information according to the radio frame to be used to send the common information and a radio resource of the common information, where the radio frame and the radio resource are determined by the control unit 702.

According to the base station in FIG. 7, when sending common information to user equipment, the base station 700 further sends additional information to the user equipment, where data packets of the additional information and data packets of the common information are the same at a MAC layer. Thus, in a case of receiving the common information and the additional information, the user equipment may determine a data packet at the MAC layer according to the common information and the additional information; therefore a probability of correct detection of the common information may be increased.

Figure 8:
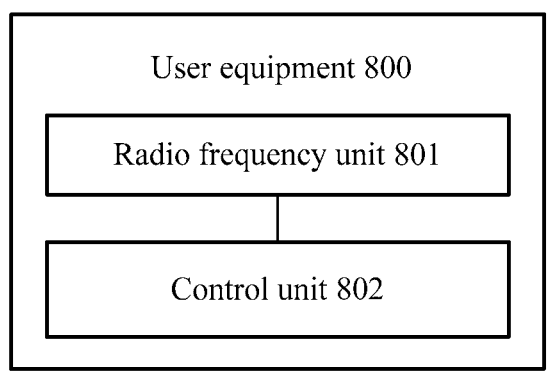
FIG. 8 is a schematic structural diagram of user equipment according to the present invention.

FIG. 8 is a schematic structural diagram of user equipment according to the present invention. User equipment 800 in FIG. 8 may execute all steps executed by user equipment in FIG. 3. The user equipment 800 includes a radio frequency unit 801 and a control unit 802.

The radio unit 801 is configured to receive common information and additional information sent by a base station, where the common information is a paging message and/or system information, and data packets of the additional information and data packets of the common information are the same at a MAC layer.

The control unit 802 is configured to determine a data packet at the MAC layer according to the common information and the additional information.

According to the user equipment in FIG. 8, when receiving common information, user equipment 800 may further receive additional information, where data packets of the additional information and data packets of the common information are the same at a MAC layer. Thus, in a case of receiving the common information and the additional information, the user equipment 800 may determine a data packet at the MAC layer according to the common information and the additional information; therefore a probability of correct detection of the common information may be increased.

Figure 9:
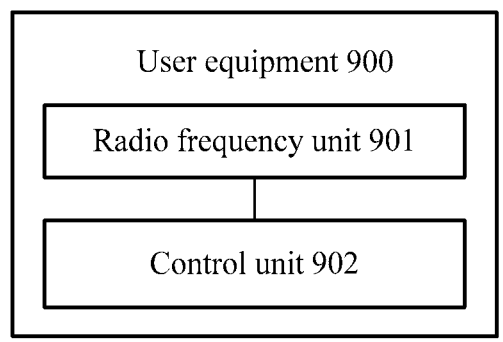
FIG. 9 is a schematic structural diagram of user equipment according to the present invention.

FIG. 9 is a schematic structural diagram of user equipment according to the present invention. User equipment 900 in FIG. 9 may execute all steps executed by user equipment in FIG. 3 or FIG. 4. The user equipment 900 includes a radio frequency unit 901 and a control unit 902.

The control unit 902 is configured to determine a radio resource that is used to receive common information and a radio resource that is used to receive additional information, where the common information is a paging message and/or system information, and data packets of the additional information and data packets of the common information are the same at a MAC layer.

The control unit 902 is specifically configured to determine, according to a wireless communication protocol or a parameter carried in a physical broadcast channel, a radio resource set that can receive the common information and the additional information, where the radio resource set includes a radio frame.

The control unit 902 is specifically configured to determine, from the radio resource set, the radio resource that is used to receive the common information and the radio resource that is used to receive the additional information.

The control unit 902 is specifically configured to, in a case in which the common information is a paging message, determine, from the radio resource set according to requirement information of the user equipment and an ID of the user equipment, the radio resource that is used to receive the common information and the additional information.

The control unit 902 is specifically configured to, in a case in which the common information is system information, to determine, from the radio resource set according to the wireless communication protocol and/or the parameter carried in a physical broadcast channel, the radio resource that is used to receive the common information and the additional information.

Optionally, the control unit 902 may be configured to determine, according to the requirement information, to receive the common information and the additional information in one or more radio frames. Specifically, the control unit 902 may be configured to determine, according to the requirement information, to receive, in one radio frame, the common information and the additional information sent by the base station, and the control unit 902 may further be configured to determine, according to the requirement information, to receive, in at least two radio frames, the common information and the additional information sent by the base station. Optionally, in a case in which the common information and the additional information are received in at least two radio frames, the control unit 902 may be configured to determine to receive the common information in one radio frame of the at least two radio frames, and receive the additional information in a remaining radio frame of the at least two radio frames, and the control unit 902 may further be configured to determine to receive the common information and the additional information in one radio frame of the at least two radio frames and receive the additional information in a remaining radio frame of the at least two radio frames.

Optionally, when the common information is a paging message, and in a case in which the control unit 902 determines to receive, in one radio frame, the common information and the additional information sent by the base station, the control unit 902 may determine, from the radio resource set according to the ID of the user equipment, a system frame number of a radio frame that is used to receive the common information and the additional information.

Optionally, when the common information is a paging message, and in a case in which the control unit 902 determines to receive, in at least two radio frames, the common information and the additional information sent by the base station, the control unit 902 may determine, from the radio resource set according to the ID of the user equipment, a system frame number of each radio frame in the at least two radio frames. Optionally, in a case in which the at least two radio frames are two consecutive radio frames, the control unit 902 may determine, from the radio resource set according to the ID of the user equipment, a system frame number of a first radio frame in the at least two frames, and determine a system frame number of another radio frame according to a determined quantity of radio frames.

Further, when the common information is a paging message, and in a case in which the control unit 902 determines the system frame number of the radio frame that is used to receive the common information and the additional information, the control unit 902 determines, according to the requirement information and the ID of the user equipment, a subframe number of the common information and the additional information in the radio frame whose system frame number is determined, or further determines a frequency domain resource location of a subframe corresponding to the subframe number.

Optionally, in a case in which at least two consecutive subframes in the radio frame can be used to receive the common information and the additional information, the control unit 902 may determine a subframe number of a first subframe, and determine, according to a quantity of subframes that need to receive the common information and the additional information, a subframe number of another subframe that may receive the common information and the additional information.

The radio frequency unit 901 is configured to receive the common information and the additional information in the determined radio resource.

The control unit 902 is further configured to determine a data packet at the MAC layer according to the common information and the additional information.

Specifically, in a case in which the common information and the additional information are generated by using same original information bits and coding redundant bits of different versions in a physical layer modulation and coding scheme, during decoding, the control unit 902 obtains, by joint decoding, the original information bits with reference to the coding redundant bits of different versions from different additional information, so as to determine the data packet at the MAC layer, thereby increasing accuracy of decoding of the common information.

In a case in which the common information and the additional information are generated in a resource mapping manner that ensures a same effective bit rate, the control unit 902 may obtain, by demodulation and decoding, soft bit information separately from the common information and each piece of additional information, and then accumulate the soft bit information, so as to determine the data packet at the MAC layer, thereby increasing the accuracy of decoding the common information.

In a case in which the common information and the additional information are generated in a resource mapping manner that ensures a same effective bit rate, the control unit 902 may first estimate originally sent signals from the common information and each piece of additional information, and then accumulate the estimated originally sent signals, and then perform demodulation and decoding, so as to determine the data packet at the MAC layer, thereby increasing the accuracy of decoding the common information; or the control unit 902 may obtain, by demodulation and decoding, soft bit information separately from the common information and each piece of additional information, and then accumulate the soft bit information, so as to determine the data packet at the MAC layer, thereby increasing the accuracy of decoding the common information.

In a case in which the common information and the additional information are generated in a resource mapping manner that ensures a same effective bit rate and in a same channel coding and signal modulation scheme, the control unit 902 may first estimate originally sent signals from the common information and each piece of additional information, and then accumulate the estimated originally sent signals, and then perform demodulation and decoding, so as to determine the data packet at the MAC layer, thereby increasing the accuracy of decoding the common information; or the control unit 902 may obtain, by demodulation and decoding, soft bit information separately from the common information and each piece of additional information, and then accumulate the soft bit information, so as to determine the data packet at the MAC layer, thereby increasing the accuracy of decoding the common information.

In a case in which the common information and the additional information are generated in a resource mapping manner that ensures a same effective bit rate and by mapping to a same frequency domain resource location, the control unit 902 may first estimate originally sent signals from the common information and each piece of additional information, and then accumulate the estimated originally sent signals, and then perform demodulation and decoding, so as to determine the data packet at the MAC layer, thereby increasing the accuracy of decoding the common information; or the control unit 902 may obtain, by demodulation and decoding, soft bit information separately from the common information and each piece of additional information, and then accumulate the soft bit information, so as to determine the data packet at the MAC layer, thereby increasing the accuracy of decoding the common information; or the control unit 902 may further directly combine signals that are received in a same frequency domain resource location, and estimate a sent signal according to the received signals, and then demodulate the sent signal, so as to determine the data packet at the MAC layer, thereby increasing the accuracy of decoding the common information.

According to the user equipment in FIG. 9, when receiving common information, the user equipment 900 may further receive additional information, where data packets of the additional information and data packets of the common information are the same at a MAC layer. Thus, in a case of receiving the common information and the additional information, the user equipment may determine a data packet at the MAC layer according to the common information and the additional information; therefore a probability of correct detection of the common information may be increased.

Figure 10:
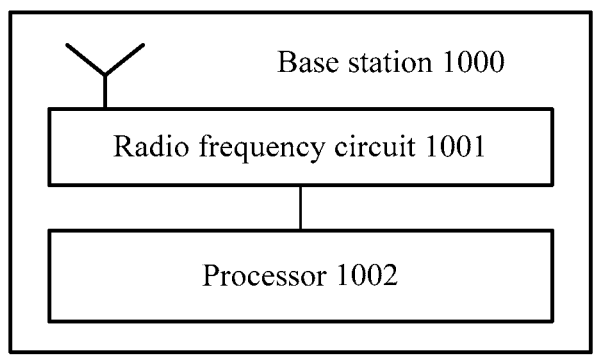
FIG. 10 is a schematic structural diagram of a base station according to the present invention.

FIG. 10 is a schematic structural diagram of a base station according to the present invention; A base station 1000 shown in FIG. 10 may execute all steps executed by a base station in FIG. 1 or FIG. 2. The base station 1000 includes a radio frequency circuit 1001 and a processor 1002.

The processor 1002 is configured to determine, according to specific information, a quantity of additional information to be sent to user equipment, where data packets of the additional information and common information are the same at a MAC layer, so that performance of the user equipment in detecting the common information according to the additional information can be improved, where the common information is a paging message and/or system information, and the specific information includes one or more of the following: a wireless communication protocol, a parameter carried in a physical broadcast channel and requirement information of the user equipment.

The processor 1002 is configured to acquire the requirement information of the user equipment, where the requirement information of the user equipment includes a quantity of times that the additional information is to be sent required by the user equipment. Specifically, the processor 1002 may acquire, by using the radio frequency circuit 1001, the requirement information sent by the user equipment, or may acquire the requirement information of the user equipment from a network side.

Optionally, a specific rule may be designed in the wireless communication protocol to stipulate a quantity of times that the common information and the additional information need to be sent. The processor 1002 may determine, according to the wireless communication protocol, the quantity of times that the additional information is to be sent to the user equipment. For example, if the wireless communication protocol stipulates that system information needs to be sent to the user equipment for N times, the processor 1002 determines to send the additional information to the user equipment for N−1 times, where N is a positive integer greater than 0.

Optionally, the parameter carried in a physical broadcast channel may include information about a quantity times that the common information and the additional information are to be sent, and the processor 1002 may determine, according to the information about a quantity of times, the quantity of times that the additional information is to be sent to the user equipment. For example, if it is determined, in the parameter carried in a physical broadcast channel, that a paging message needs to be sent to the user equipment for N times, the processor 1002 determines to send the additional information to the user equipment for N−1 times, where N is a positive integer greater than 0.

Optionally, a specific rule may be designed in the wireless communication protocol to determine the quantity of times that the common information and the additional information need to be sent, and the rule may stipulate that the quantity of times that the common information and the additional information need to be sent is determined by using the parameter carried in a physical broadcast channel. The processor 1002 may determine, according to the rule and the parameter carried in a physical broadcast channel, the quantity of times that the common information and the additional information are to be sent. For example, a specific formula may be designed in the wireless communication protocol to determine the quantity of times that the common information and the additional information need to be sent, and a parameter in the formula may be the parameter carried in a physical broadcast channel.

Optionally, the processor 1002 may determine, according to the acquired requirement information of the user equipment, the quantity of times that the additional information is to be sent to the user equipment.

The processor 1002 is further configured to determine a radio resource set that can be used to send the common information and the additional information, where the radio resource set includes a radio frame.

The processor 1002 is further configured to determine, from the radio resource set, a radio resource to be used to send the common information and the additional information to the user equipment, where the radio resource belongs to the radio resource set.

In a case in which the common information is a paging message, the processor 1002 is specifically configured to determine, from the radio resource set according to the requirement information of the user equipment and an ID of the user equipment, the radio resource to be used to send the common information and the additional information to the user equipment, the radio resource belongs to the radio resource set.

In a case in which the common information is system information, the processor 1002 is specifically configured to determine, from the radio resource set according to the wireless communication protocol and/or the parameter carried in a physical broadcast channel, the radio resource to be used to send the common information and the additional information to the user equipment, the radio resource belongs to the radio resource set.

Optionally, the processor 1002 may be configured to determine, according to the requirement information of the user equipment, to use one or more radio frames to send the common information and the additional information. Specifically, the processor 1002 may be configured to determine, according to the requirement information of the user equipment, to use one radio frame to send the common information and the additional information to the user equipment. The processor 1002 may further be configured to determine to use at least two radio frames to send the common information and the additional information to the user equipment. Optionally, in a case in which at least two radio frames are used to send the common information and the additional information, the processor 1002 may determine to use one radio frame of the at least two radio frames to send the common information and use a remaining radio frame of the at least two radio frames to send the additional information, and the processor 1002 may determine to use one of the at least two radio frames to send the common information and the additional information and use a remaining radio frame of the at least two radio frames to send the additional information.

Optionally, when the common information is a paging message, and in a case in which it is determined that a radio resource subset that consists of one radio frame is used to send the common information and the additional information to the user equipment, the processor 1002 may further be configured to determine, from the radio resource set according to the ID of the user equipment, a system frame number of a radio frame to be used to send the common information and the additional information.

Optionally, when the common information is a paging message, and in a case in which it is determined that at least two radio frames are used to send the common information and the additional information to the user equipment, the processor 1002 may further be configured to determine, from the radio resource set according to the ID of the user equipment, a system frame number of each radio frame in the at least two radio frames. Optionally, in a case in which the at least two radio frames are two consecutive radio frames, the processor 1002 may further be configured to determine, from the radio resource set according to the ID of the user equipment, a system frame number of a first radio frame in the at least two frames, and determine a system frame number of another radio frame according to a quantity of radio frames that need to be used.

Further, when the common information is a paging message, and in a case in which the system frame number of the radio frame to be used to send the common information and the additional information is determined, the processor 1002 may further be configured to determine, according to the requirement information of the user equipment and the ID of the user equipment, a subframe number of the common information and/or the additional information in the radio frame whose system frame number has already been determined, or further determines a frequency domain resource location of a subframe corresponding to the subframe number.

The processor 1002 is further configured to generate the additional information according to the common information.

Specifically, the processor 1002 may generate, in a physical layer channel modulation and coding scheme, the additional information by using original information bits the same as those of the common information and coding redundant bits whose version is different from that of coding redundant bits of the common information; or the processor 1002 may generate the additional information in a resource mapping manner that ensures a same effective bit rate as that of the common information; or the processor 1002 may generate the additional information in a channel coding and signal modulation scheme the same as that of the common information; the processor 1002 may generate the additional information in a resource mapping manner that ensures a same effective bit rate as that of the common information and in a channel coding and signal modulation scheme the same as that of the common information; and the processor 1002 may generate the additional information in a resource mapping manner that ensures a same effective bit rate as that of the common information and by mapping to a frequency domain resource location the same as that of the common information.

The radio frequency circuit 1001 is configured to send the common information and the additional information according to the radio frame to be used to send the common information and the radio resource of the common information, where the radio frame and the radio resource are determined by the processor 1002.

According to the base station in FIG. 10, when sending common information to user equipment, a base station 1000 further sends additional information to the user equipment, where data packets of the additional information and data packets of the common information are the same at a MAC layer. Thus, in a case of receiving the common information and the additional information, the user equipment may determine a data packet at the MAC layer according to the common information and the additional information; therefore a probability of correct detection of the common information may be increased.

Figure 11:
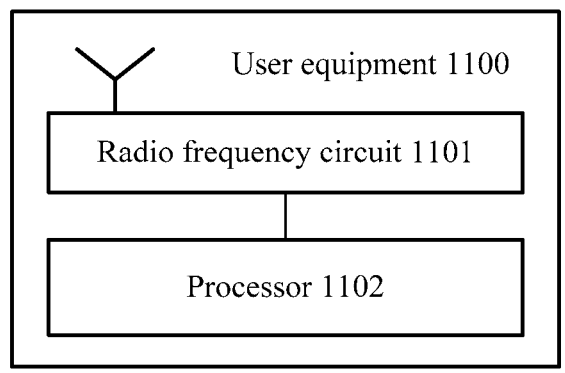
FIG. 11 is a schematic structural diagram of user equipment according to the present invention.

FIG. 11 is a schematic structural diagram of user equipment according to the present invention. User equipment 1100 in FIG. 11 may execute all steps executed by user equipment in FIG. 3 or FIG. 4. The user equipment 1100 includes a radio frequency circuit 1101 and a processor 1102.

The processor 1102 is configured to determine a radio resource that is used to receive common information and a radio resource that is used to receive additional information, where the common information is a paging message and/or system information, and data packets of the additional information and data packets of the common information are the same at a MAC layer.

The processor 1102 is specifically configured to determine, according to a wireless communication protocol or a parameter carried in a physical broadcast channel, a radio resource set that can receive the common information and the additional information, where the radio resource set includes a radio frame.

The processor 1102 is specifically configured to determine, from the radio resource set, the radio resource that is used to receive the common information and the radio resource that is used to receive the additional information.

The processor 1102 is specifically configured to, in a case in which the common information is a paging message, determine, from the radio resource set according to requirement information of the user equipment and an ID of the user equipment, the radio resource that is used to receive the common information and the additional information.

The processor 1102 is specifically configured to, in a case in which the common information is system information, to determine, from the radio resource set according to the wireless communication protocol and/or the parameter carried in a physical broadcast channel, the radio resource that is used to receive the common information and the additional information.

Optionally, the processor 1102 may be configured to determine, according to the requirement information, to receive the common information and the additional information in one or more radio frames. Specifically, the processor 1102 may be configured to determine, according to the requirement information, to receive, in one radio frame, the common information and the additional information sent by the base station, and the processor 1102 may further be configured to determine, according to the requirement information, to receive, in at least two radio frames, the common information and the additional information sent by the base station. Optionally, in a case in which the common information and the additional information are received in at least two radio frames, the processor 1102 may be configured to determine to receive the common information in one radio frame of the at least two radio frames, and receive the additional information in a remaining radio frame of the at least two radio frames, and the processor 1102 may further be configured to determine to receive the common information and the additional information in one radio frame of the at least two radio frames and receive the additional information in a remaining radio frame of the at least two radio frames.

Optionally, when the common information is a paging message, and in a case in which the processor 1102 determines to receive, in one radio frame, the common information and the additional information sent by the base station, the processor 1102 may determine, from the radio resource set according to the ID of the user equipment, a system frame number of a radio frame that is used to receive the common information and the additional information.

Optionally, when the common information is a paging message, and in a case in which the processor 1102 determines to receive, in at least two radio frames, the common information and the additional information sent by the base station, the processor 1102 may determine, from the radio resource set according to the ID of the user equipment, a system frame number of each radio frame in the at least two radio frames. Optionally, in a case in which the at least two radio frames are two consecutive radio frames, the processor 1102 may determine, from the radio resource set according to the ID of the user equipment, a system frame number of a first radio frame in the at least two frames, and determine a system frame number of another radio frame according to a determined quantity of radio frames.

Further, when the common information is a paging message, and in a case in which the processor 1102 determines the system frame number of the radio frame that is used to receive the common information and the additional information, the processor 1102 determines, according to the requirement information and the ID of the user equipment, a subframe number of the common information and the additional information in the radio frame whose system frame number has been determined, or further determines a frequency domain resource location of a subframe corresponding to the subframe number.

Optionally, in a case in which at least two consecutive subframes in the radio frame can be used to receive the common information and the additional information, the processor 1102 may determine a subframe number of a first subframe, and determine, according to a quantity of subframes that need to receive the common information and the additional information, a subframe number of another subframe that may receive the common information and the additional information.

The radio frequency circuit 1101 is configured to receive, by using an antenna, the common information and the additional information in the determined radio resource.

The processor 1102 is further configured to determine a data packet at the MAC layer according to the common information and the additional information.

Specifically, in a case in which the common information and the additional information are generated by using same original information bits and coding redundant bits of different versions in a physical layer modulation and coding scheme, during decoding, the processor 1102 obtains, by joint decoding, the original information bits with reference to the coding redundant bits of different versions from different additional information, so as to determine the data packet at the MAC layer, thereby increasing accuracy of decoding of the common information.

In a case in which the common information and the additional information are generated in a resource mapping manner that ensures a same effective bit rate, the processor 1102 may obtain, by demodulation and decoding, soft bit information separately from the common information and each piece of additional information, and then accumulate the soft bit information, so as to determine the data packet at the MAC layer, thereby increasing the accuracy of decoding the common information.

In a case in which the common information and the additional information are generated in a resource mapping manner that ensures a same effective bit rate, the processor 1102 may estimate originally sent signals from the common information and each piece of additional information, and then accumulate the estimated originally sent signals, and then perform demodulation and decoding, so as to determine the data packet at the MAC layer, thereby increasing the accuracy of decoding the common information; or the processor 1102 may obtain, by demodulation and decoding, soft bit information separately from the common information and each piece of additional information, and then accumulate the soft bit information, so as to determine the data packet at the MAC layer, thereby increasing the accuracy of decoding the common information.

In a case in which the common information and the additional information are generated by using a same effective bit rate in resource mapping and in a same channel coding and signal modulation scheme, the processor 1102 may estimate originally sent signals from the common information and each piece of additional information, and then accumulate the estimated originally sent signals, and then perform demodulation and decoding, so as to determine the data packet at the MAC layer, thereby increasing accuracy of decoding of the common information; or the processor 1102 may obtain, by demodulation and decoding, soft bit information separately from the common information and each piece of additional information, and then accumulate the soft bit information, so as to determine the data packet at the MAC layer, thereby increasing the accuracy of decoding the common information.

In a case in which the common information and the additional information are generated in a resource mapping manner that ensures a same effective bit rate and by mapping to a same frequency domain location, the processor 1102 may first estimate originally sent signals from the common information and each piece of additional information, and then accumulate the estimated originally sent signals, and then perform demodulation and decoding, so as to determine the data packet at the MAC layer, thereby increasing accuracy of decoding of the common information; or the processor 1102 may obtain, by demodulation and decoding, soft bit information separately from the common information and each piece of additional information, and then accumulate the soft bit information, so as to determine the data packet at the MAC layer, thereby increasing the accuracy of decoding the common information; or the processor 1102 may further directly combine signals that are received in a same frequency domain resource location, and estimate a sent signal according to the received signals, and then demodulate the sent signal, so as to determine the data packet at the MAC layer, thereby increasing accuracy of decoding of the common information.

According to the user equipment in FIG. 11, when receiving common information, user equipment 1100 may further receive additional information, where data packets of the additional information and data packets of the common information are the same at a MAC layer. Thus, in a case of receiving the common information and the additional information, the user equipment may determine a data packet at the MAC layer according to the common information and the additional information; therefore a probability of correct detection of the common information may be increased.

A person of ordinary skill in the art may be aware that the exemplary units and algorithm steps described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed in a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting common information, comprising:
   generating additional information according to common information, wherein the common information is at least one of: a paging message and system information, and data packets of the additional information and data packets of the common information are the same at a Media Access Control (MAC) layer;
   determining, according to specific information, a quantity of times that the additional information is to be sent to the user equipment, wherein the specific information comprises at least one of the following: a wireless communication protocol, a parameter carried in a physical broadcast channel, and requirement information of the user equipment; and
   after determining the quantity of times that the additional information is to be sent to the user equipment, sending the common information and the additional information to a user equipment.

2. The method according to claim 1, wherein the generating additional information according to common information comprises one of:
   generating, in a physical layer channel modulation and coding scheme, the additional information by using original information bits the same as those of the common information and coding redundant bits whose version is different from that of coding redundant bits of the common information;
   generating the additional information in a resource mapping manner that ensures a same effective bit rate as the common information;
   generating the additional information in a channel coding and signal modulation scheme the same as that of the common information;
   generating, in a resource mapping manner that ensures a same effective bit rate as that of the common information and in a channel coding and signal modulation scheme the same as that of the common information; and
   generating the additional information in a resource mapping manner that ensures a same effective bit rate as that of the common information and by mapping to a frequency domain resource location the same as that of the common information.

3. The method according to claim 1, wherein the determining, from the radio resource set, a radio resource to be used to send the common information and the additional information to the user equipment comprises:
   when the common information is a paging message, determining, from the radio resource set according to the requirement information of the user equipment and an identifier (ID) of the user equipment, the radio resource to be used to send the common information and the additional information to the user equipment; and when the common information is system information, determining, from the radio resource set according to at least one of: the wireless communication protocol and the parameter carried in a physical broadcast channel, the radio resource to be used to send the common information and the additional information to the user equipment.

4. The method according to claim 3, wherein the determining, from the radio resource set according to the requirement information of the user equipment and an ID of the user equipment, the radio resource to be used to send the common information and the additional information to the user equipment comprises:

determining, according to the requirement information of the user equipment, to use at least one radio frame to send the common information and the additional information;

determining a system frame number of the at least one radio frame from the radio resource set according to the ID of the user equipment; and determining, according to the requirement information of the user equipment and the ID of the user equipment, a subframe number of the common information and the additional information in the at least one radio frame.

5. A method for transmitting common information, comprising:

determining a radio resource that is used to receive common information and a radio resource that is used to receive additional information, wherein the common information and the additional information are sent by a base station, the common information is at least one of a paging message and system information, and data packets of the additional information and data packets of the common information are the same at a Media Access Control (MAC) layer;

wherein the determining a radio resource that is used to receive the common information and a radio resource that is used to receive the additional information comprises:

determining a radio resource set according to at least one of a wireless communication protocol and a parameter carried in a physical broadcast channel;

determining, from the radio resource set, the radio resource that is used to receive the common information and the radio resource that is used to receive the additional information;

after determining the radio resource that is used to receive common information and the radio resource that is used to receive additional information, receiving the common information and the additional information; and determining a data packet at the MAC layer according to the common information and the additional information.

6. The method according to claim 5, wherein the determining a data packet at the MAC layer according to the common information and the additional information comprises:

when the common information and the additional information are generated by using same original information bits and coding redundant bits of different versions in a physical layer modulation and coding scheme, determining the data packet at the MAC layer with reference to the coding redundant bits of different versions and the original information bits;

when the common information and the additional information are generated in a resource mapping manner that ensures a same effective bit rate, determining soft bit information from the common information and the additional information and accumulating the soft bit information, so as to determine the data packet at the MAC layer;

when the common information and the additional information are generated in a same channel coding and signal modulation scheme, and when the common information and the additional information are generated in a resource mapping manner that ensures a same effective bit rate and in a same channel coding and signal modulation scheme at least one of:

determining originally sent signals from the common information and the additional information and accumulating the originally sent signals, so as to determine the data packet at the MAC layer; and determining soft bit information from the common information and the additional information and accumulating the soft bit information, so as to determine the data packet at the MAC layer; and when the common information and the additional information are generated in a resource mapping manner that ensures a same effective bit rate and by mapping to a same frequency domain resource location, at least one of:

determining originally sent signals from the common information and the additional information and accumulating the determined originally sent signals, so as to determine the data packet at the MAC layer;

determining soft bit information from the common information and the additional information and accumulating the soft bit information, so as to determine the data packet at the MAC layer; and combining received signals that are received in a same frequency domain resource location and are of the common information and the additional information, so as to determine the data packet at the MAC layer.

7. The method according to claim 5, wherein the determining the radio resource that is used to receive the common information and the radio resource that is used to receive the additional information comprises:

when the common information is a paging message, determining, from the radio resource set according to requirement information and an identifier (ID) of the user equipment, the radio resource that is used to receive the common information and the radio resource that is used to receive the additional information; and when the common information is system information, determining, from the radio resource set according to at least one of the wireless communication protocol and the parameter carried in a physical broadcast channel, the radio resource that is used to receive the common information and the radio resource that is used to receive the additional information.

8. The method according to claim 7, wherein the determining, from the radio resource set according to requirement information and an ID of the user equipment, the radio resource that is used to receive the common information and the radio resource that is used to receive the additional information comprises:

determining, according to the requirement information, to receive the common information and the additional information in at least one radio frame;

determining a system frame number of the at least one radio frame from the radio resource set according to the ID of the user equipment; and determining, according to the requirement information and the ID of the user equipment, a subframe number of the common information and the additional information in the at least one radio frame, wherein the at least one radio frame belongs to the radio resource subset.

9. A base station, comprising:

a processor, configured to generate additional information according to common information, wherein the common information is at least one of a paging message and system information, and data packets of the additional information and data packets of the common information are the same at a Media Access Control MAC layer and determine, according to specific information, a quantity of times that the additional information is to be sent by the radio frequency unit to the user equipment, wherein the specific information comprises at least one of the following: a wireless communication protocol, a parameter carried in a physical broadcast channel, and requirement information of the user equipment; and a radio frequency unit, configured to send the common information and the additional information to user equipment.

10. The base station according to claim 9, further comprising at least one of:

the processor is specifically configured to generate, in a physical layer channel modulation and coding scheme, the additional information by using original information bits the same as those of the common information and coding redundant bits whose version is different from that of coding redundant bits of the common information;

the processor is specifically configured to generate the additional information in a resource mapping manner that ensures a same effective bit rate as that of the common information;

the processor is specifically configured to generate the additional information in a channel coding and signal modulation scheme the same as that of the common information;

the processor is specifically configured to generate the additional information in a resource mapping manner that ensures a same effective bit rate as that of the common information and in a channel coding and signal modulation scheme the same as that of the common information; and the processor is specifically configured to generate the additional information in a resource mapping manner that ensures a same effective bit rate as that of the common information and by mapping to a frequency domain resource location the same as that of the common information.

11. The base station according to claim 9, wherein, the processor is specifically configured to determine, from the radio resource set according to the requirement information of the user equipment and an identifier (ID) of the user equipment, the radio resource to be used to send the common information and the additional information to the user equipment, wherein the radio resource belongs to the radio resource set and the common information is a paging message; and the processor is specifically configured to determine, from the radio resource set according to one of the wireless communication protocol and the parameter carried in a physical broadcast channel, the radio resource to be used to send the common information and the additional information to the user equipment, wherein the radio resource belongs to the radio resource set and the common information is system information.

12. The base station according to claim 11, wherein, the processor is specifically configured to determine, according to the requirement information of the user equipment, to use at least one radio frame to send the common information and the additional information;

the processor is specifically configured to determine a system frame number of the at least one radio frame from the radio resource set according to the ID of the user equipment; and the processor is specifically configured to determine, according to the requirement information of the user equipment and the ID of the user equipment, a subframe number of the common information and the additional information in the at least one radio frame.

13. A user equipment, comprising:

a radio frequency unit, configured to receive common information and additional information sent by a base station, wherein the common information is a paging message and/or system information, and data packets of the additional information and data packets of the common information are the same at a Media Access Control (MAC) layer; and a processor, configured to determine a data packet at the MAC layer according to the common information and the additional information and determine a radio resource that is used to receive the common information and a radio resource that is used to receive the additional information;

wherein, the processor is specifically configured to determine a radio resource set according to at least one of a wireless communication protocol and a parameter carried in a physical broadcast channel; and the processor is specifically configured to determine, from the radio resource set, the radio resource that is used to receive the common information and the radio resource that is used to receive the additional information.

14. The user equipment according to claim 13, wherein, the processor is specifically configured to, when the common information and the additional information are generated by using same original information bits and coding redundant bits of different versions in a physical layer modulation and coding scheme, determine the data packet at the MAC layer with reference to the coding redundant bits of different versions and the original information bits;

the processor is specifically configured to, when the common information and the additional information are generated in a resource mapping manner that ensures a same effective bit rate, determine soft bit information from the common information and the additional information and accumulate the soft bit information, so as to determine the data packet at the MAC layer;

the processor is specifically configured to, when the common information and the additional information are generated in a resource mapping manner that ensures a same effective bit rate, and when the common information and the additional information are generated in a resource mapping manner that ensures a same effective bit rate and in a same channel coding and signal modulation scheme, at least one of:

determine originally sent signals from the common information and the additional information and accumulate the determined originally sent signals, so as to determine the data packet at the MAC layer; and determine soft bit information from the common information and the additional information and accumulate the soft bit information, so as to determine the data packet at the MAC layer; and the processor is specifically configured to, when the common information and the additional information are generated in a resource mapping manner that ensures a same effective bit rate and by mapping to a same frequency domain resource location, at least one of:

determine originally sent signals from the common information and the additional information and accumulate the determined originally sent signals, so as to determine the data packet at the MAC layer;

determine soft bit information from the common information and the additional information and accumulate the soft bit information, so as to determine the data packet at the MAC layer; and combine received signals that are received in a same frequency domain resource location and are of the common information and the additional information, so as to determine the data packet at the MAC layer.

15. The user equipment according to claim 13, wherein,
the processor is specifically configured to, when the common information is a paging message, determine, from the radio resource set according to the requirement information of the user equipment and an identifier (ID) of the user equipment, the radio resource that is used to receive the common information and the radio resource that is used to receive the additional information; and the processor is specifically configured to, when the common information is system information, determine, from the radio resource set according to at least one of: the wireless communication protocol and the parameter carried in a physical broadcast channel, the radio resource that is used to receive the common information and the radio resource that is used to receive the additional information.

16. The user equipment according to claim 15, wherein,
the processor is specifically configured to determine, according to the requirement information, to use at least one radio frame to receive the common information and the additional information;

the processor is specifically configured to determine a system frame number of the at least one radio frame from the radio resource set according to the ID of the user equipment; and the processor is specifically configured to determine, according to the requirement information and the ID of the user equipment, a subframe number of the common information and the additional information in the at least one radio frame.

* * * * *